United States Patent
Esaka et al.

(10) Patent No.: US 9,075,530 B2
(45) Date of Patent: Jul. 7, 2015

(54) STORAGE SYSTEM AND THE STORAGE SYSTEM MANAGEMENT METHOD

(71) Applicant: Hitachi, Ltd., Tokyo (JP)

(72) Inventors: Tomonori Esaka, Tokyo (JP); Masayasu Asano, Tokyo (JP)

(73) Assignee: Hitachi, Ltd., Tokyo (JP)

(*) Notice: Subject to any disclaimer, the term of this patent is extended or adjusted under 35 U.S.C. 154(b) by 235 days.

(21) Appl. No.: 14/359,920

(22) PCT Filed: Aug. 27, 2013

(86) PCT No.: PCT/JP2013/072852
§ 371 (c)(1),
(2) Date: May 22, 2014

(87) PCT Pub. No.: WO2015/029133
PCT Pub. Date: Mar. 5, 2015

(65) Prior Publication Data
US 2015/0153959 A1    Jun. 4, 2015

(51) Int. Cl.
G06F 12/16    (2006.01)
G06F 3/06    (2006.01)
G06F 9/455    (2006.01)

(52) U.S. Cl.
CPC ............ G06F 3/0619 (2013.01); G06F 3/0689 (2013.01); G06F 3/0665 (2013.01); G06F 9/45558 (2013.01); G06F 3/065 (2013.01)

(58) Field of Classification Search
CPC .... G06F 3/065; G06F 9/45558; G06F 3/0665
USPC .................................. 711/114, 161
See application file for complete search history.

(56) References Cited

U.S. PATENT DOCUMENTS

| | | | |
|---|---|---|---|
| 2009/0313503 A1* | 12/2009 | Atluri et al. ..................... | 714/19 |
| 2010/0138621 A1 | 6/2010 | Arifin | |
| 2011/0078395 A1 | 3/2011 | Okada et al. | |
| 2012/0017042 A1* | 1/2012 | Matsui et al. ................. | 711/114 |

(Continued)

FOREIGN PATENT DOCUMENTS

| JP | 2010-128899 A | 6/2010 |
|---|---|---|
| JP | 2011-76286 A | 4/2011 |

(Continued)

OTHER PUBLICATIONS

International Search Report and Written Opinion (ISA220, ISA210, ISA237), dated Nov. 19, 2013, (PCT/JP2013/072852).

Primary Examiner — Than Nguyen
(74) Attorney, Agent, or Firm — Mattingly & Malur, PC

(57) ABSTRACT

Management of a storage system is facilitated by associating physical volumes of the storage system with virtual volumes corresponding to virtual machines according to specified storage policies in advance. A plurality of disk control devices manage a specified storage area provided by the plurality of physical disks as one or more logical volumes and map the one or more logical volumes matching a storage policy or policies, which include capacity information about a virtual machine(s) and are set to construct the virtual machine, to a virtual volume(s) provided to the virtual machine in response to a request from the management server; and wherein when one of the storage policies is selected, the management server constructs the virtual machine by associating the virtual volume, which complies with the storage policy, with the virtual machine.

10 Claims, 23 Drawing Sheets

(56) References Cited

U.S. PATENT DOCUMENTS

| | | |
|---|---|---|
| 2012/0221699 A1 | 8/2012 | Moriyasu et al. |
| 2013/0054932 A1 | 2/2013 | Acharya et al. |
| 2013/0145092 A1 | 6/2013 | Miwa et al. |
| 2013/0179648 A1 | 7/2013 | Yagame et al. |
| 2013/0275678 A1 | 10/2013 | Matsui et al. |
| 2014/0068210 A1* | 3/2014 | Deguchi ..................... 711/162 |
| 2014/0297733 A1* | 10/2014 | Wang et al. ................. 709/203 |
| 2015/0074458 A1* | 3/2015 | Atluri et al. ..................... 714/19 |

FOREIGN PATENT DOCUMENTS

| | | |
|---|---|---|
| JP | 2013/038510 A1 | 3/2013 |
| WO | 2012/007999 A1 | 1/2012 |
| WO | 2012/117507 A1 | 9/2012 |
| WO | 2013/103006 A1 | 7/2013 |

* cited by examiner

FIG.4

| VM NAME | VIRTUAL DISK | CAPACITY | DATA STORE NAME | DEVICE TYPE |
|---------|--------------|----------|-----------------|-------------|
| VM1 | VMDK1 | 300GB | DATA STORE 1 | SAS |
| VM2 | VMDK2 | 100GB | DATA STORE 2 | SSD |
| VM3 | VMDK3 | 100GB | DATA STORE 3 | SATA |
| VM3 | VMDK4 | 100GB | DATA STORE 4 | SATA |
| VM5 | VMDK5 | 300GB | DATA STORE 5 | CUSTOM_A |
| VM6 | VMDK6 | 300GB | DATA STORE 6 | CUSTOM_B |
| ... | ... | ... | ... | ... |

| DATA STORE NAME | CAPACITY | DEVICE NAME | VOLUME | DATA STORE TYPE | DEVICE TYPE |
|---|---|---|---|---|---|
| DATA STORE 1 | 300GB | STORAGE 1 | VVOL1 | VVOL | SAS |
| DATA STORE 2 | 100GB | STORAGE 1 | VVOL2 | VVOL | SSD |
| DATA STORE 3 | 200GB | STORAGE 1 | VVOL3 | VVOL | SATA |
| DATA STORE 5 | 300GB | STORAGE 1 | VVOL5 | VVOL | CUSTOM_A |
| DATA STORE 6 | 300GB | STORAGE 1 | VVOL6 | VVOL | CUSTOM_B |
| ... | ... | ... | ... | ... | ... |

| VVOL# | VVOL CAPACITY | GDEV CAPACITY | COMPONENT OF GDEV # | COMPONENT OF DKC # | DEVICE TYPE | IOPS |
|---|---|---|---|---|---|---|
| 1 | 300GB | 100GB | 1,3,5 | 1,2,3 | SAS | 600 |
| 2 | 100GB | 100GB | 2 | 1 | SSD | 1000 |
| 3 | 200GB | 100GB | 4,6 | 2,3 | SATA | 300 |
| 5 | 300GB | 100GB | 7,8,9 | 1,2,3 | CUSTOM_A | 1000 |
| 6 | 300GB | 30GB | 10-19 | 1-10 | CUSTOM_B | 1500 |
| ... | ... | ... | ... | ... | ... | ... |

| GDEV# | SITE # | DKC# | LDEV# | CAPACITY | DEVICE TYPE |
|---|---|---|---|---|---|
| 1 | 1 | 1 | 1 | 100GB | SAS |
| 2 | 1 | 1 | 2 | 100GB | SSD |
| 3 | 1 | 2 | 1 | 100GB | SAS |
| 4 | 1 | 2 | 2 | 100GB | SATA |
| 5 | 1 | 3 | 1 | 100GB | SAS |
| 6 | 1 | 3 | 2 | 100GB | SATA |
| 7 | 1 | 1 | 3 | 100GB | SSD |
| 8 | 1 | 2 | 3 | 100GB | SAS |
| 9 | 1 | 3 | 3 | 100GB | SAS |
| 10 | 1 | 1 | 4 | 30GB | SAS |
| 11 | 1 | 2 | 4 | 30GB | SAS |
| 12 | 1 | 3 | 4 | 30GB | SAS |
| 13 | 1 | 4 | 4 | 30GB | SAS |
| 14 | 1 | 5 | 4 | 30GB | SAS |
| 15 | 1 | 6 | 4 | 30GB | SAS |
| 16 | 1 | 7 | 4 | 30GB | SAS |
| 17 | 1 | 8 | 4 | 30GB | SAS |
| 18 | 1 | 9 | 4 | 30GB | SAS |
| 19 | 1 | 10 | 4 | 30GB | SAS |
| 20 | 1 | 4 | 1 | 100GB | SAS |
| ... | ... | ... | ... | ... | ... |

| LDEV# | CAPACITY | DEVICE TYPE |
|---|---|---|
| 1 | 100GB | SAS |
| 2 | 100GB | SSD |
| 3 | 100GB | SSD |
| 4 | 30GB | SAS |
| ... | ... | ... |

| STORAGE POLICY NAME | DEVICE TYPE | CAPACITY | UPPER LIMIT IOPS | LOWER LIMIT IOPS | REMOTE COPY TYPE | REMOTE SITE # | ... |
|---|---|---|---|---|---|---|---|
| STORAGE POLICY A | SAS | 300GB | 200 | 1000 | HIGH-SPEED DR | 2 | ... |
| STORAGE POLICY B | SAS | 300GB | 200 | 1000 | MEDIUM-SPEED DR | 2 | ... |
| STORAGE POLICY C | SAS | 300GB | 200 | 1000 | LOW-SPEED DR | 2 | ... |
| STORAGE POLICY D | CUSTOM_A | 300GB | 500 | 2000 | NONE | — | ... |
| STORAGE POLICY E | CUSTOM_B | 300GB | 500 | 2000 | NONE | — | ... |
| ... | ... | ... | ... | ... | ... | ... | ... |

2240  2241  2242  2243  2244  2245  2246

224

STORAGE SYSTEM AND THE STORAGE SYSTEM MANAGEMENT METHOD

TECHNICAL FIELD

The present invention relates to a storage system and a storage system management method and is suited for use in a storage system and storage system management method for constructing a virtual environment system.

BACKGROUND ART

With a disk array apparatus for controlling, for example, writing of data to a plurality of hard disk drives (hereinafter sometimes referred to as HDDs [Hard Disk Drives])), a support capacity of the disk array apparatus itself increases significantly along with an increase of the capacity of the HDDs and the number of the mounted HDDs. However, performance of a controller for controlling the HDDs cannot sometimes respond to the increase of the capacity of the HDDs.

So, Patent Literature 1 provides a high-performance disk array apparatus by virtualizing a plurality of disk array apparatuses across physical boundaries as one storage system.

Furthermore, Patent Literature 2 discloses a technique that provides a virtual volume (VVOL: Virtual Volume) corresponding to a virtual machine (VM: Virtual Machine).

CITATION LIST

Patent Literature

[Patent Literature 1] WO 2012/007999
[Patent Literature 2] U.S. Unexamined Patent Application Publication No. 2013/0054932

SUMMARY OF INVENTION

Problems to be Solved by the Invention

However, since data are handled on a volume basis in a virtual environment provided in Patent Literature 1, volumes provided by the storage system and virtual volumes provided by virtual machines need to be mapped manually in order to use a program product function of the storage system in that environment, thereby causing a problem of cumbersome management for a large-scale system.

The present invention was devised in consideration of the above-described circumstances and aims at suggesting a storage system and storage system management method for facilitating management of the storage system by associating physical volumes of the storage system with virtual volumes corresponding to virtual machines according to a specified storage policy in advance.

Means for Solving the Problems

In order to solve the above-described problem, provided according to the present invention is a storage system with a plurality of disk control devices having a plurality of physical disks connected via a network to a management server for managing the plurality of physical disks allocated to a virtual machine(s), wherein the plurality of disk control devices: manage a specified storage area provided by the plurality of physical disks as one or more logical volumes; and map the one or more logical volumes matching storage policies, which include capacity information about the virtual machine(s) and are preset to constructing the virtual machine(s), to a virtual volume(s) provided to the virtual machine in response to a request from the management server; and wherein when one of the storage policies is selected, the management server constructs the virtual machine by associating the virtual volume, which complies with the storage policy, with the virtual machine.

According to the above-described configuration, the plurality of disk control devices map one or more logical volumes, which match a preset storage policy, to a virtual volume; and if any one of the storage policies is selected according to input by, for example, a system administrator, the management server constructs a virtual machine by associating a virtual volume(s), which satisfies a condition set to the relevant storage policy, with the virtual machine. As a result, when constructing a virtual machine, environment construction for the storage system is facilitated and management of the entire system is facilitated by applying the storage policy such as a device type, disk capacity, and performance, automating mapping between virtual volumes corresponding to the virtual machine and volumes provided by the storage system.

Advantageous Effects of Invention

According to the present invention, management of the storage system can be facilitated by associating physical volumes of the storage system with the virtual volumes corresponding to the virtual machines according to a specified storage policy in advance.

BRIEF DESCRIPTION OF DRAWINGS

FIG. 4 is a chart illustrating the content of a virtual machine management table according to the embodiment.

FIG. 5 is a chart illustrating the content of a data store management table according to the embodiment.

FIG. 6 is a chart illustrating the content of a virtual volume management table according to the embodiment.

FIG. 7 is a chart illustrating the content of a GDEV management table according to the embodiment.

FIG. 8 is a chart illustrating the content of an LDEV management table according to the embodiment.

FIG. 9 is a chart illustrating the content of a storage policy management table according to the embodiment.

MODE FOR CARRYING OUT THE INVENTION

Figure 1:
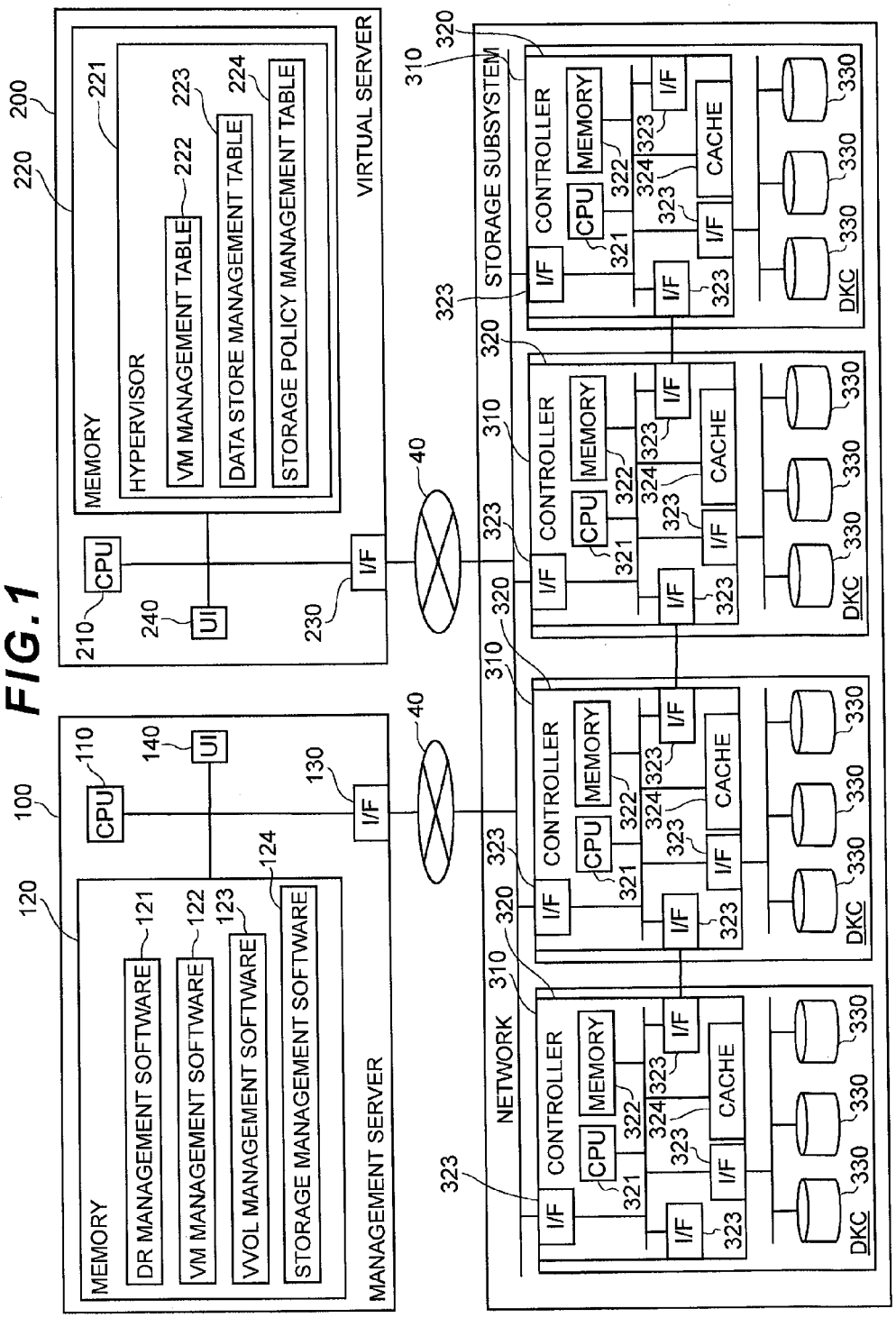
FIG. 1 is a block diagram illustrating the configuration of a computer system according to a first embodiment of the present invention.

An embodiment of the present invention will be described below in detail with reference to drawings.

Incidentally, various pieces of information will be sometimes explained in the description below, using the expression "xxx table(s)," but these various pieces of information may be expressed by data structures other than the tables. Accordingly, the "xxx table(s)" can be called "xxx information" in order to indicate that such information does not depend on the data structures.

An ID (identifier) or number is used in the description below to identify an element, but other types of information (such as a name) may be used as identification information.

The following explanation may be given by using the word "program" as a subject. However, since a program is executed by execution of specified processing by a processor (such as a CPU [Central Processing Unit]) using storage resources (such as a memory) and/or a communication interface unit (such as a communication port) as appropriate, the processor may be used as a subject. The processing explained by using a program as a subject may be processing executed by a disk control device, a controller for the disk control device, or a management server. The processor may include a hardware circuit for executing a part or whole of the processing executed by the processor. A computer program may be installed in each computer from a program source. The program source may be, for example, a program distribution server or a storage medium.

(1) First Embodiment (1-1) Outline of this Embodiment

Firstly, the outline of this embodiment will be explained. Conventionally, a high-performance disk array apparatus is provided by virtualizing a plurality of disk control devices across physical boundaries as one storage system as described above. Also, virtual volumes corresponding to virtual machines are provided to a host.

However, data are treated on a volume basis in a conventional virtual environment. So, in order to utilize a product program function of the storage system in that environment, volumes provided by a storage system and virtual volumes provided by virtual machines must be mapped manually.

Furthermore, with the conventional virtual environment, it is necessary to create a virtual volume to be provided to a host and a logical volume to be managed by one of controllers for the storage system on a one-to-one basis and, therefore, a logical volume cannot be created across a plurality of controllers. Consequently, with the conventional virtual environment, for example, remote copying can be processed by a plurality of controllers; however, when performing, for example, copying of one volume, processing cannot be executed by using the plurality of controllers, thereby causing a problem of inability to promote the efficiency of the storage system.

So, according to this embodiment, the speed of, for example, remote copying can be increased by: creating a volume across a plurality of controllers by having logical volumes provided by the storage system cooperate with virtual volumes corresponding to virtual machines; and using the plurality of controllers when copying a volume. Specifically speaking, mapping between the virtual volumes provided by the virtual machines and the volumes provided by the storage system is automated by applying storage policies such as a device type, disk capacity, and performance when constructing a virtual machine; and as a result, environment construction of the storage system is facilitated and management of the entire system is facilitated. Consequently, environment construction for disaster recovery (DR: Disaster Recovery) can also be facilitated. It is also possible to execute, for example, migration without stopping the virtual machines when performing load distribution of the storage system. The environment construction for the disaster recovery will be explained in detail with respect to a second embodiment and the load distribution of the storage system will be explained in detail with respect to a third embodiment.

(1-2) Configuration of Computer System

A computer system according to this embodiment includes a management server 100, a virtual server 200 controlled by the management server 100, and a storage subsystem 300 as illustrated in FIG. 1.

The management server 100 is a computer device for maintaining or managing the virtual server 200 and the storage subsystem 300. The virtual server 200 is an apparatus which is controlled by the management server 100, virtually divides physical computer resources for the virtual server 200 and the storage subsystem 300, and manages the configurations of a plurality of virtual machines (VM: Virtual Machines) to which the divided computer resources are allocated respectively. Incidentally, a case in which one virtual server 200 manages a plurality of virtual machines will be explained; however, the invention is not limited to such an example and one or more virtual servers 200 may manage one or more virtual machines in the one or more virtual servers 200.

The storage subsystem 300 has a plurality of disks 330 and is connected with the management server 100 and the virtual server 200 via a network 40. The network 40 is, for example, an FC (Fibre Channel) network, a LAN (Local Area Network), or the Internet.

(1-3) Hardware Configuration of Each Apparatus (1-3-1) Hardware Configuration of Management Server The management server 100 includes, for example, a CPU 110, a memory 120, an interface (indicated as I/F in the drawing) 130, and a user interface (indicated as UI in the drawing) 140 as illustrated in FIG. 1.

The CPU 110 functions as an arithmetic processing unit and a control unit and controls the operation of the entire management server 100 in accordance with various programs stored in the memory 120.

The memory 120 stores, for example, programs and operation parameters used by the CPU 110 and is composed of, for example, a ROM (Read Only Memory) or a RAM (Random Access Memory). The memory 120 stores, for example, management programs for managing construction and changes of virtual machines in the virtual server 200 (disaster recovery software (indicated as DR management software in the drawing) 121, virtual machine management software (indicated as VM management software in the drawing) 122, virtual volume management software (indicated as VVOL management software in the drawing) 123), and a management program for managing the configuration of the storage subsystem 300 (storage management software 124). Each management program will be explained later in detail.

The interface 130 is an interface connected with external equipment and is a connection port for connection with the external equipment which is capable of data transmission and is to be connected to, for example, a local area network (LAN).

The user interface 140 is an input/output device. Examples of the input/output device can be a display, a keyboard, and a pointer device and may also be devices other than those. Moreover, in place of the input/output device, a serial interface or an Ethernet interface may be used as the input/output device; and a display computer having a display, a keyboard, or a pointer device is connected to that interface, display information is transmitted to the display computer, and input information is received from the display computer, thereby displaying the information on the display computer; and inputs are accepted by the display computer, thereby substituting for input and display by the input/output device.

(1-3-2) Hardware Configuration of Virtual Server

The virtual server 200 includes a CPU 210, a memory 220, an interface (indicated as I/F in the drawing) 230, and a user interface (indicated as UI in the drawing) 240 as illustrated in FIG. 1. The virtual server 200 is actually managed by the management server 100 and a virtual server environment is constructed by executing a hypervisor 221.

The CPU 210 functions as an arithmetic processing unit and control unit and controls the operation of the entire virtual server 200 in accordance with various programs stored in the memory 220.

The memory 220 stores, for example, programs and operation parameters used by the CPU 210 and is composed of, for example, a ROM (Read Only Memory) or a RAM (Random Access Memory). Typical examples of the programs are an OS (Operating System) and application programs. The application programs access LUs (Logical Units) provided from the storage subsystem 300 described later. The LUs are logical storage devices and sometimes referred to as logical volumes.

Furthermore, the memory 220 stores various tables for managing the configuration of virtual machines (a virtual machine management table (indicated as the VM management table in the drawing) 222, a data store management table 223, and a storage policy management table 224). Each management table will be explained later in detail.

Since the interface 230 and the user interface 240 are the same as the interface 130 and the user interface 140 for the management server 100 as described above, a detailed explanation about them has been omitted.

(1-3-3) Hardware Configuration of Storage Subsystem

The storage subsystem 300 is composed of a plurality of disk control devices 310 connected via a network.

The disk control device 310 is a device (for example, a disk array apparatus) including a controller (hereinafter referred to as the internal controller) 320 for controlling storage of data in a plurality of physical storage media by using, for example, RAID (Redundant Array of Inexpensive Disks) control. The physical storage media are, for example, disk-type storage media (such as HDDs (Hard Disk Drives)). The disk control device may be sometimes referred to as the "DKC" (Disk Control Apparatus).

Moreover, examples of the disk-type storage media can be, for example, FC (Fibre Channel), SAS (Serial Attached SCSI), ATA (Advanced Technology Attachment), or SATA (Serial ATA) drives. Also, instead of the disk-type storage media, the physical storage media may be other types of physical storage media such as SSDs (Solid State Drives), or semiconductor memory storage devices/boards.

Furthermore, each disk control device 310 includes a CPU 321, a memory 322, an interface (indicated as I/F in the drawing) 323, and a cache 324 as illustrated in FIG. 1. The CPU 321 functions as an arithmetic processing unit and control unit and controls the operation of the entire disk control device 310 in accordance with various programs stored in the memory 322.

Figure 2:
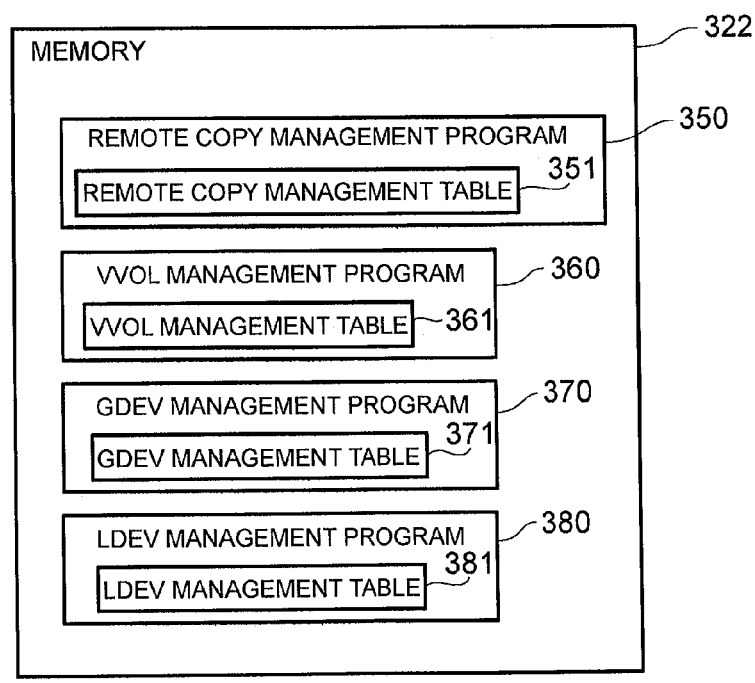
FIG. 2 is a block diagram illustrating the configuration of a memory for a disk control device according to the embodiment.

The memory 322 stores, for example, programs and operation parameters used by the CPU 321 and is composed of, for example, a ROM (Read Only Memory) or a RAM (Random Access Memory). The memory 322 stores various management programs and management tables as illustrated in FIG. 2. Specifically speaking, the memory 322 stores, for example, a virtual volume (indicated as VVOL in the drawing) management program 360 and virtual volume management table 361 for managing various volumes and disks, a GDEV management program 370 and GDEV management table 371 for managing GDEVs, which are logical volumes managed by the disk control devices 310, and an LDEV management program 380 and LDEV management table 381. The memory 322 also stores a remote copy management program 350 and remote copy management table 351 for managing remote copying as explained in a second embodiment.

Referring back to FIG. 1, the cache 324 temporarily stores data to be written to the disks 330 and data which have been read from the disks 330. At least one cache 324 may have, in addition to a storage area (CM area) used as a cache memory, a storage area (SM area) used as a shared memory (SM) for a plurality of controller modules.

(1-4) Volume Cooperation between Virtual Server and Storage Subsystem

Figure 3:
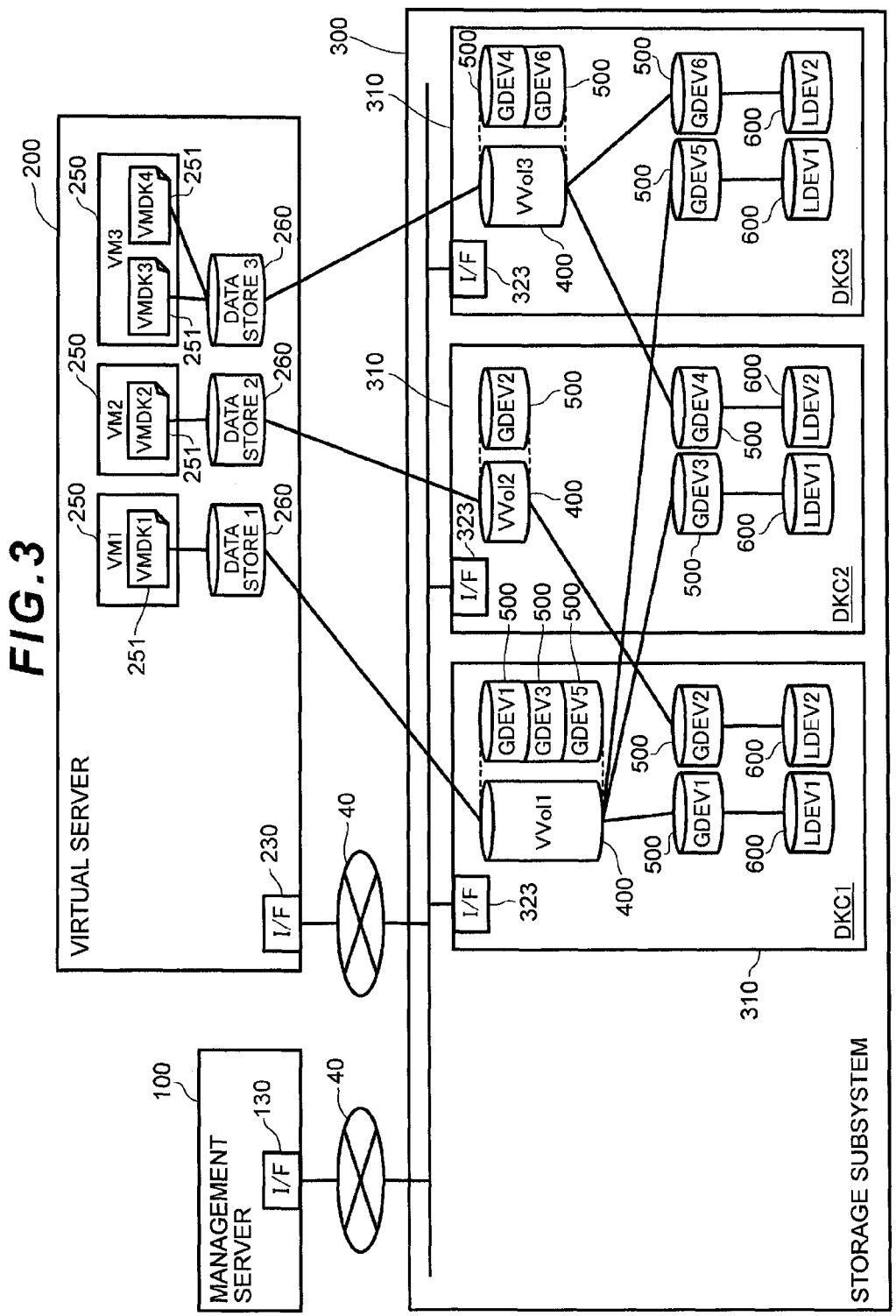
FIG. 3 is a conceptual diagram for explaining cooperation between virtual volumes and physical volumes according to the embodiment.

Next, referring to FIG. 3, cooperation between virtual volumes corresponding to virtual machines (VM) 250 in the virtual server 200 and physical volumes provided by the disk control devices 310 for the storage subsystem 300.

A virtual machine (VM1, VM2, or VM3) 250 constructed in the virtual server 200 includes one or more virtual disks (VMDK1, VMDK2, VMDK3, VMDK4) 251 as illustrated in FIG. 3. Also, a data store (a data store 1, a data store 2, or a data store 3) 260 is a virtual volume for constructing the virtual disk(s) 251. When constructing each virtual machine 250, which data store 260 among the data stores 260 which were created in advance should be used to create a virtual disk (VMDK) having how much capacity is decided.

Moreover, in the disk control device 310 for the storage subsystem 300, logical volumes (each of such logical volumes will be hereinafter referred to as GDEV), to which a serial number assigned for the entire storage subsystem 300 are constructed corresponding to logical volumes that are logical storage devices (hereinafter each of such logical volumes will be referred to as LDEV). As a result, a plurality of LDEVs managed by the plurality of disk control devices 310 can be used by the plurality of disk control devices 310; the disk control devices 310 composed of a plurality of chassis can be treated as if they were composed of one chassis; and a plurality of LDEVs managed by the individual disk control devices 310 can be treated as GDEVs managed by one virtual disk control device.

Regarding the aforementioned Patent Literature 1, a data store 260 and GDEV 1 need to correspond to each other one to one. For example, there is a possible case in which one GDEV may be made to correspond to two data stores and data stored in only one data store are to be migrated to the other data store; however, in this case, data are migrated on an LDEV basis, that is, on a GDEV basis, so that only data in one data store cannot be migrated.

However, when the data store 260 and GDEV 1 are made to correspond to each other on a one-to-one basis, only a controller for one disk control device 310 executes processing on one GDEV at the time of remote copying. So, the problem is that although controllers for the plurality of disk control devices 310 can execute processing in parallel, the processing such as remote copying cannot be executed by the plurality of disk control devices 310.

Therefore, in this embodiment, a virtual volume(s) (VVol: Virtual Volume(s)) is created on the disk control devices 310 and one or more GDEVs are mapped to the virtual volume(s). For example, as illustrated in FIG. 1, GDEV 1, GDEV 2, and GDEV 5 are mapped to volume VVol 1 created by a disk control device DKC 1, GDEV 2 is mapped to a virtual volume VVol 2 created by a disk control device DKC 2, and GDEV 4 and GDEV 6 are mapped to a virtual volume VVol 3 created by a disk control device DKC 3.

In fact, GDEV 1 and GDEV 2 are managed by the disk control device DKC 1, GDEV 3 and GDEV 4 are managed by the disk control device DKC 2, and GDEV 5 and GDEV 6 are managed by the disk control device DKC 3; and each disk control device 310 which manages each logical volume writes and reads data. Therefore, when performing, for example, remote copying of the virtual volume VVol 1, GDEV 1, GDEV 3, and GDEV 5 which have been mapped to VVol 1 can be processed in parallel by the controllers for DKC 1, DKC 2, and DKC 3. The remote copy at the time of the disaster recovery construction will be explained in detail with respect to the second embodiment.

Moreover, as a virtual volume VVol is mapped by a plurality of GDEVs, only the virtual volume VVol can be seen from outside the storage subsystem 300. So, even if a GDEV with high access frequency is to be replaced with another GDEV, data can be migrated without changing mapping with the data store 260 associated with the virtual disk 251 for the virtual machine 250. The migration according to the access frequency will be explained in detail with respect to the third embodiment.

Furthermore, in this embodiment, when constructing a virtual machine 250 as described above, mapping between a virtual volume (the data store 260) in the virtual machine 250 and a logical volume(s) (GDEV) 500 provided by the storage system is automated by applying storage policies such as the device type, the disk capacity, and the performance.

Specifically speaking, when storage policies including, for example, the device type, the disk capacity, and the performance are defined and the relationship between virtual volume (VVol) networks 40 and logical volumes (GDEV) 500 is established for each policy in advance, and if a user selects a storage policy when constructing a virtual machine 250, a virtual volume (VVol) network 40 corresponding to the selected policy can be mapped to a data store 260. As a result, an administrator who manages the virtual server 200 can easily set settings of the storage system for constructing the virtual machine 250 simply by selecting the appropriate policy for a desired storage environment.

(1-5) Various Tables

Next, management tables for enabling cooperation between virtual volumes (data stores 260) for the virtual machines 250 and logical volumes (GDEVs 500 and LDEVs 500) in the disk control devices 310.

Referring to FIG. 4, the virtual machine management table 222 for managing virtual machines constructed in the virtual server 200 will be explained. The virtual machine management table 222 is a table managed by the hypervisor 221 for the virtual server 200. The virtual machine management table 222 is constituted from a VM name column 2220, a virtual disk column 2221, a capacity column 2222, a data store name column 2223, and a device type column 2224 as illustrated in FIG. 4.

The VM name column 2220 stores the name of the relevant virtual machine 250. The virtual disk column 2221 stores the name of a virtual disk (VMDK) 251 constituting the virtual machine 250. The capacity column 2222 stores information indicative of the capacity of the virtual disk 251. The data store name column 2223 stores the name of a data store for constructing the virtual disk 251. The device type column 2224 stores information indicative of a device type of the data store.

FIG. 4 shows that, for example, a virtual machine VM3 is composed of virtual disks VMDK3 and VMDK4, the capacity of VMDK3 and VMDK4 is 100, the data store 260 constituting VMDK3 and VMDK4 is data store 3, and the device type is SATA.

Next, the data store management table 223 for managing data stores 260 constituting virtual disks 251 will be explained with reference to FIG. 5. The data store management table 223 is a table managed by the hypervisor 221 for the virtual server 200. The data store management table 223 is constituted from a data store name column 2230, a capacity column 2231, a device name column 2232, a volume column 2233, a data store type column 2234, and a device type column 2235 as illustrated in FIG. 5.

The data store name column 2230 stores the name of the relevant data store 260. The data store capacity column 2231 stores information indicative of the capacity of the data store 260. The device name column 2232 stores the name of a storage apparatus which provides the data store 260. The volume column 2233 stores the name of a virtual volume (VVol) network 40 associated with the data store 260. The data store type column 2234 stores information indicative of the type of the data store. The device type column 2235 stores information indicative of the device type of the data store 260.

FIG. 5 shows that, for example, the capacity of data store 1 is 300 GB, that capacity is provided from storage 1, the data store is associated with the virtual volume VVol 1, the data store type is VVOL, and the device type is SAS.

Next, the virtual volume management table 361 for managing virtual volume VVol networks 40 will be explained with reference to FIG. 6. The virtual volume management table 361 is a table managed by each disk control device 310. The virtual volume management table 361 is constituted from a VVOL number column 3610, a VVOL capacity column 3611, a GDEV capacity column 3612, a component-of-GDEV-number column 3613, a component-of-DKC-number column 3614, a device type column 3615, and an IOPS column 3616 as illustrated in FIG. 6.

The VVOL number column 3610 stores information for identifying the relevant virtual volume network 40. The VVOL capacity column 3611 stores information indicative of the capacity of the virtual volume network 40. The GDEV capacity column 3612 shows the capacity of a GDEV(s) 500 mapped to the virtual volume network 40. The component-of-GDEV-number column 3613 stores the name of a GDEV(s) 500 mapped to the virtual volume network 4. The component-of-DKC-number column 3614 stores information for identifying the disk control devices 310 which manage the GDEV(s) 500 mapped to the virtual volume network 40. The device type column 3615 stores information indicative of the device type of the GDEV(s) mapped to the virtual volume network 40. The IOPS column 3616 stores information indicative of IOPS (Input Output Per Second) of the GDEV(s) mapped to the virtual volume network 40.

For example, FIG. 6 shows that the capacity of the virtual volume VVol 1 is 300 GB, GDEVs 500 mapped to that VVol are GDEV 1, GDEV 3, and GDEV 5, the total capacity of the GDEVs 500 is 100 GB, the disk control devices 310 which manage the GDEVs 500 are DKC 1, DKC 2, and DKC 3, the device type is SAS, and the laps is 600.

Next, the GDEV management table 371 for managing the configuration of the GDEVs 500 managed by the disk control devices 310 will be explained with reference to FIG. 7. The GDEV management table 371 is a table managed by each disk control device 310. The GDEV management table 371 is constituted from a GDEV number column 3710, a site number column 3711, a DKC ID column 3712, an LDEV number column 3713, a capacity column 3714, and a device type 3715 as illustrated in FIG. 7.

The GDEV number column 3710 stores information for identifying the relevant GDEV 500. The site number column 3711 stores information for identifying a site where the GDEV 500 exists. The site herein means a local site or a remote site when constructing disaster recovery. For example, the site name of the local site is set as site 1 and the site name of the remote site is set as site 2. The DKC number column 3712 stores information for identifying a disk control device 310 which manages the GDEV 500. The LDEV number column 3713 stores information for identifying an LDEV 600 corresponding to the GDEV 500. The capacity column 3714 stores information indicative of the capacity of the GDEV 500. The device type 3715 stores information indicative of the device type of the GDEV 500.

FIG. 7 shows that, for example, GDEV 1 exists at site 1, is managed by DKC 1, and is associated with LDEV 1, its capacity is 100 GB, and the device type is SAS. The GDEVs 500 are logical volumes to which the serial number for the entire storage subsystem 300 is assigned, and which are made to correspond to the LDEVs 600 on a one-to-one basis, as explained earlier.

Next, the LDEV management table 381 for managing the configuration of LDEVs 600 managed by the disk control devices 310 will be explained with reference to FIG. 8. The LDEV management table 381 is a table managed by each disk control device 310. The LDEV management table 381 is constituted from an LDEV number column 3810, a capacity column 3811, and a device type column 3812 as illustrated in FIG. 8.

The LDEV number column 3810 stores information for identifying the relevant LDEV 600. The capacity column 3811 stores information indicative of the capacity of the LDEV 600. The device type column 3812 stores information indicative of the device type of the LDEV 600.

FIG. 8 shows that, for example, the capacity of LDEV 1 is 100 GB and the device type is SAS.

Next, the storage policy management table 224 for managing storage policies when constructing a virtual machine 250 will be explained with reference to FIG. 9. The storage policy management table 224 is a table managed by the hypervisor 221 for the virtual server 200 and is set by, for example, the system administrator in advance. The storage policy management table 224 is constituted from a storage policy name column 2240, a device type column 2241, a capacity column 2242, an upper limit IOPS column 2243, a lower limit IOPS 2244, a remote copy type column 2245, and a remote site number column 2246 as illustrated in FIG. 9.

The storage policy name column 2240 stores information indicative of the name of the relevant storage policy. The device type column 2241 stores information indicative of the device type to be set to the storage policy. The capacity column 2242 stores information indicative of the capacity to be set to the storage policy. The upper limit IOPS column 2243 and the lower limit IOPS 2244 store information indicative of a lower limit and upper limit of the IOPS to be set to the storage policy. The remote copy type column 2245 stores the type of remote copying to be set to the storage policy. The remote site number column 2246 stores information for identifying a remote site to be set to the storage policy.

FIG. 9 shows that, for example, regarding storage policy A, the device type is SAS, the capacity is 300 GB, the lower limit IOPS is 200, the upper limit IOPS is 1000, the remote copy type is high-speed DR, and the remote site is site 2. The remote copy type will be explained in detail with reference to the second embodiment.

In this embodiment, the storage policies illustrated in FIG. 9 are set in advance as input by the system administrator or the like and the relationship between the virtual volume (VVol) networks 40 and the logical volumes (GDEVs) 500 is established in advance with respect to each of the storage policies, so that when constructing a virtual machine 250, the settings of the storage system side for constructing the virtual machine 250 can be set merely by selecting the preset storage policy.

(1-6) Virtual Machine Creation Processing Using Storage Policy

Next, virtual machine creation processing using the storage policy as executed by the virtual machine management software 122 for the management server 100 will be explained with reference to FIG. 10 and FIG. 11.

Figure 10:
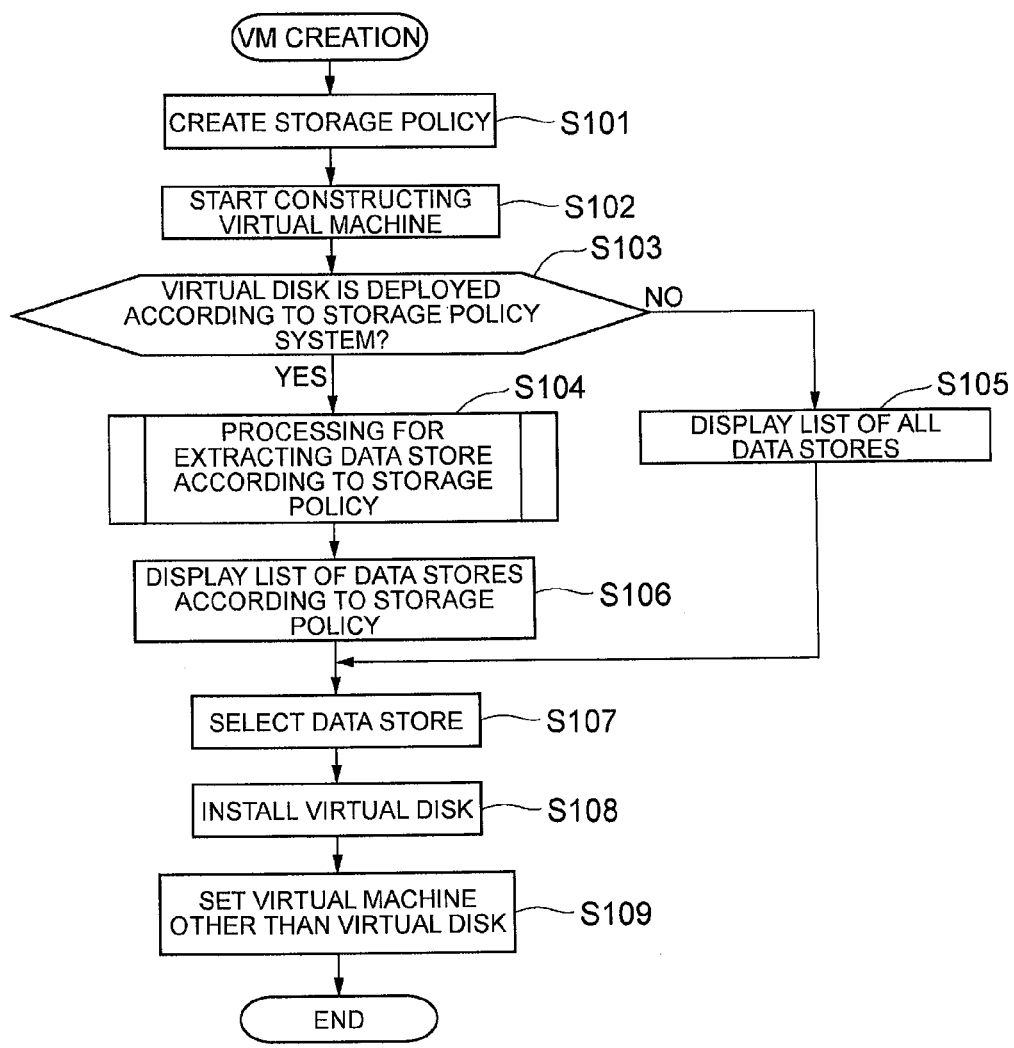
FIG. 10 is a flowchart illustrating a flow of virtual machine creation processing according to the embodiment.

The virtual machine management software 122 creates a storage policy according to input by the system administrator as illustrated in FIG. 10 (S101). In step S101, the virtual machine management software 122 sets information about, for example, the device type and the upper limit and lower limit of the capacity IOPS corresponding to the storage policy name, which has been input via, for example, an input interface of the management server 100 by the system administrator, to the storage policy management table 224.

Then, the virtual machine management software 122 starts constructing a virtual machine 250 (S102). In step S102, the virtual machine management software 122 starts constructing the virtual machine 250 by executing a program for creating the virtual machine 250.

Then, the virtual machine management software 122 judges whether or not the virtual disk to be deployed in the virtual machine 250 is according to a storage policy method, that is, whether or not the virtual disk 251 should be deployed for the virtual machine 250 by using the storage policy (S103). The virtual machine management software 122 makes the judgment in step S103 by determining whether or not the system administrator has issued an instruction to construct a virtual machine 250 by using the storage policy.

If it is determined in step S103 that the virtual disk 251 to be deployed for the virtual machine 250 is according to the storage policy method, the virtual machine management software 122 extracts a data store 260 that complies with the storage policy (S104). The data store extraction processing in step S104 will be explained with reference to FIG. 11.

Figure 11:
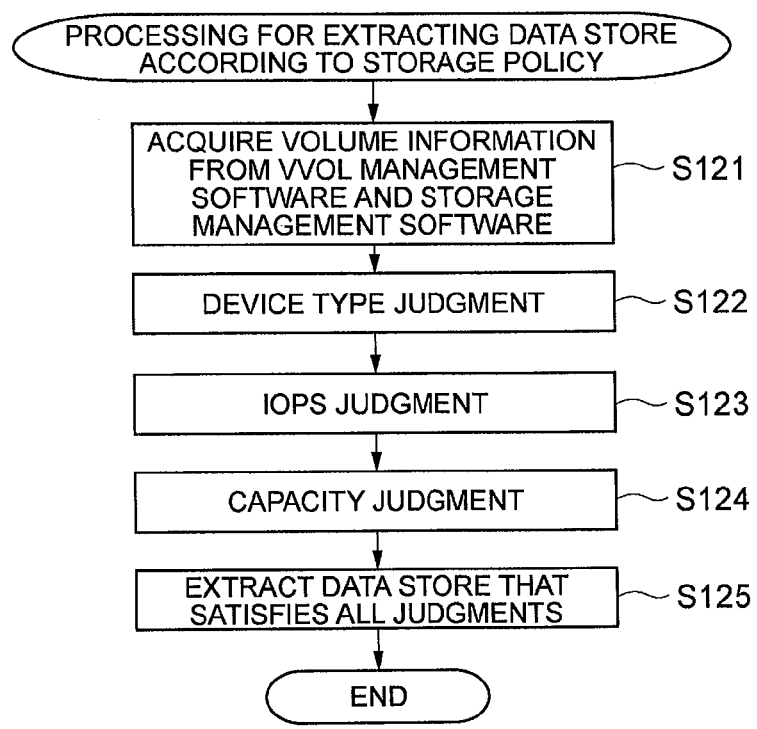
FIG. 11 is a flowchart illustrating a flow of data store extraction processing according to the embodiment.

The virtual machine management software 122 acquires volume information about the virtual volume networks 40 from the VVOL management software 123 and the storage management software 124 as illustrated in FIG. 11 (S121). Specifically speaking, the virtual machine management software 122 acquires information such as the device type, IOPS, and capacity of a plurality of virtual volume networks 40 managed by the plurality of disk control devices 310 associated with the data store 260.

Then, the virtual machine management software 122 compares the device type, which is set to the storage policy created in step S101, with the device type acquired in step S121 and judges whether any data store 260 which complies with the storage policy exists or not (S122).

Subsequently, the virtual machine management software 122 compares information about the IOPS, which is set to the storage policy created in step S101, with information about the IOPS acquired in step S121 and judges whether any data store 260 which complies with the storage policy exists or not (S123).

Subsequently, the virtual machine management software 122 compares information about the capacity, which is set to the storage policy created in step S101, with information about the capacity acquired in step S121 and judges whether any data store 260 which complies with the storage policy exists or not (S124).

Then, the virtual machine management software 122 extracts a data store 260 which satisfies all judgments in step S122 to step S124 (S125).

Referring back to FIG. 10, the virtual machine management software 122 displays a list of data stores extracted in step S104 and has a display screen of the management server 100 display the list of data stores (S106). Specifically speaking, as a result of the judgments in step S122 to step S124 in FIG. 11, the virtual machine management software 122 has the display screen of the management server 100 display the list of data stores which are determined to comply with the storage policy.

On the other hand, if it is determined in step S103 that the virtual disk 251 to be deployed for the virtual machine 250 is not according to the storage policy method, the virtual machine management software 122 has the display screen of the management server 100 display the list of all the data stores 260 (S105).

Then, the virtual machine management software 122 selects the data store selected according to input by the system administrator (S107) and sets the virtual disk 251 (S108). In step S108, the virtual machine management software 122 thereby associates the virtual disk 251 with the data store 260.

Then, the virtual machine management software 122 sets settings of the virtual machine 250 other than the settings of the virtual disk 251 (S109). In step S109, the virtual machine management software 122 sets, for example, settings of a user who uses the virtual machine 250, and security settings.

(1-7) Advantageous Effects of this Embodiment

According to this embodiment, the plurality of disk control devices 310 maps one or more logical volumes (GDEV(s) 500), which match the preset storage policies, to the virtual volume(s) (the VVOL network(s) 40); and if any one of the storage policies is selected according to input by the system administrator or the like, the management server 100 associates a virtual volume (the VVOL network 40), which satisfies the conditions set to the storage policy, with the virtual machine 250 and thereby constructs the virtual machine 250. As a result, at the time of construction of a virtual machine 250, environment construction of the storage system is facilitated and management of the entire system is facilitated by applying the storage policy such as the device type, the disk capacity, and the performance and automating mapping between the virtual volume(s) corresponding to the virtual machine 250 and the volume(s) provided by the storage system.

(2) Second Embodiment (2-1) Outline of this Embodiment

It is an object of this embodiment to facilitate construction of a DR (disaster recovery) environment and increase the speed of remote copying by using the virtual environment constructed according to the first embodiment.

In this embodiment, the aforementioned storage policies are also used when constructing the DR environment. Specifically speaking, a virtual volume is created on the disk control device 310 side and one or more GDEVs are mapped to the virtual volume, in the same manner as in the first embodiment, at both the local site and the remote side in the DR environment where remote copying is performed between the local site and the remote site.

Then, when constructing a virtual machine at the local site, a virtual volume(s) (data store(s) 260) for the virtual machine 250 is mapped to logical volume(s) (GDEV(s)) 500 provided by the storage system by applying the storage policy set by, for example, the system administrator in the same manner as in the first embodiment. Then, when constructing a virtual machine at the remote site, mapping between a data store(s) 260 and a GDEV(s) 500 at the remote site can be automated by making the configuration of the GDEV(s) 500 the same as that at the local site.

Furthermore, in this embodiment in the same manner as in the first embodiment, a virtual volume network 40 is created across controllers for the plurality of disk control devices 310 by having logical volumes (GDEVs 500) provided by the disk control devices 310 and the virtual volumes (VVOL networks 40) corresponding to the virtual machine(s) cooperate with each other. As a result, the speed of remote copying can be increased by executing remote copying of the virtual volume network 40 by using the plurality of controllers.

(2-2) Configuration of Computer System

Figure 12:
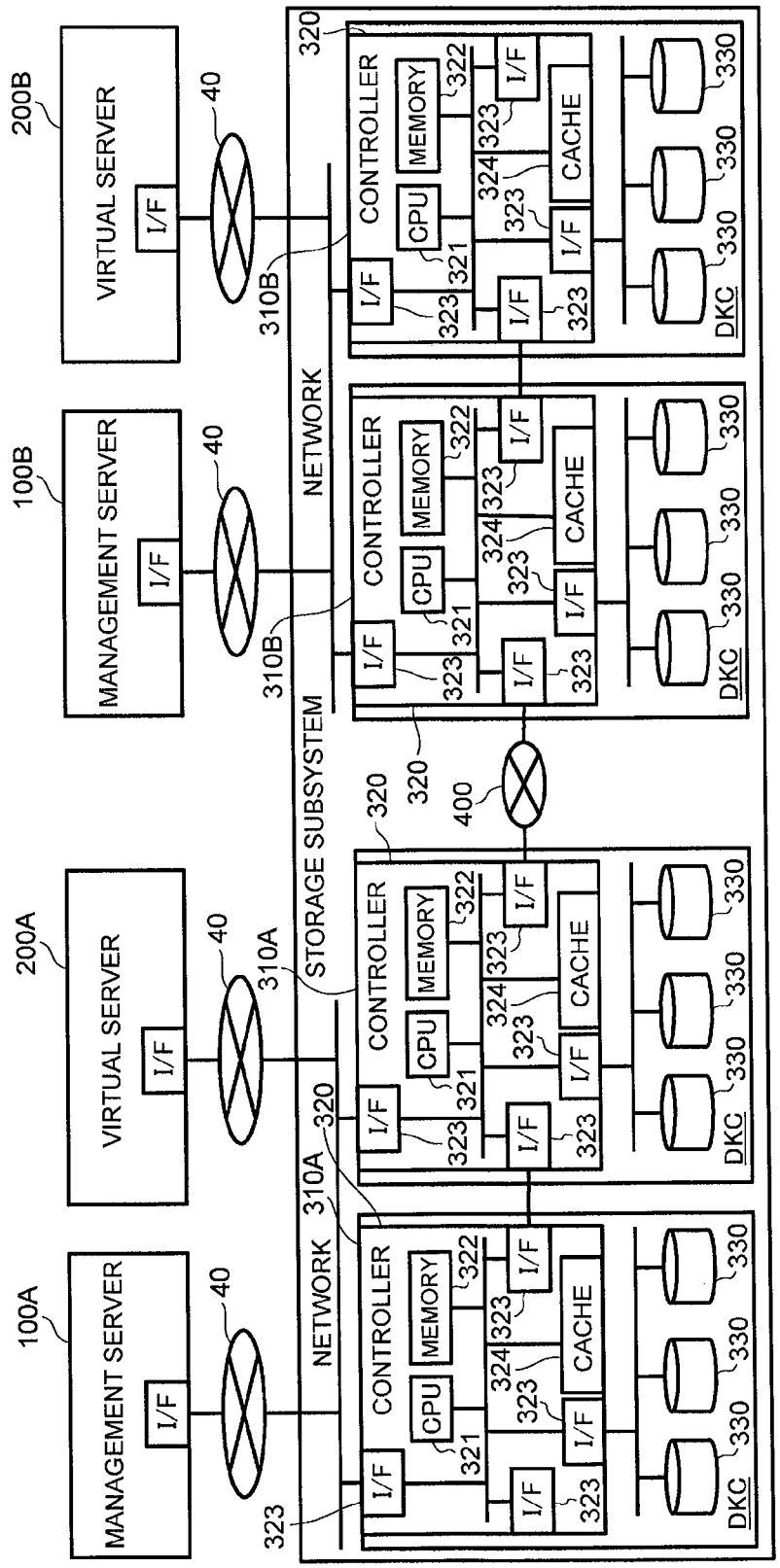
FIG. 12 is a block diagram illustrating the configuration of a computer system according to a second embodiment of the present invention.

A computer system according to this embodiment includes a local site constituted from a management server 100A, a virtual server 200A, and a disk control device 310A and a remote site constituted from a management server 100B, a virtual server 200B, and a disk control device 310B as illustrated in FIG. 12. The disk control device 310A at the local site and the disk control device 310B at the remote site are connected via a network and data stored in the disk control device 310A at the local site are backed up to the disk control device 310B at the remote site by means of a remote copy function. An environment in which data at the local site are backed up to the remote site by means of the remote copy function may be sometimes referred to and explained as the DR (disaster recovery) environment. Furthermore, the management servers 100A and 100B can set settings of, for example, virtual volumes at the remote copy destination in the management server 100A by assigning a serial number to volumes existing at a plurality of disk control devices 310A and 310B.

The hardware configuration of the management server 100A, the virtual server 200A, and the disk control devices 310A for the storage subsystem 300A, which constitute the local site, and the management server 100B, the virtual server 200B, and the disk control devices 310B for the storage subsystem 300B, which constitute the remote site, is the same as that of the management server 100, the virtual server 200, and the disk control device 310 for the storage subsystem 300 according to the first embodiment, so that any detailed explanation about it has been omitted.

(2-3) Volume Cooperation between Virtual Server and Storage Subsystem

Cooperation between virtual volumes corresponding to the virtual machines (VM) 250 in the virtual server 200 and physical volumes provided by the disk control devices 310 for the storage subsystem 300 is the same as that in the first embodiment. Volume cooperation at the time of configuration construction of the DR environment according to this embodiment will be particularly explained below in detail. Also, various tables of each apparatus are the same as those in the first embodiment, so that any explanation about them has been omitted.

Figure 13:
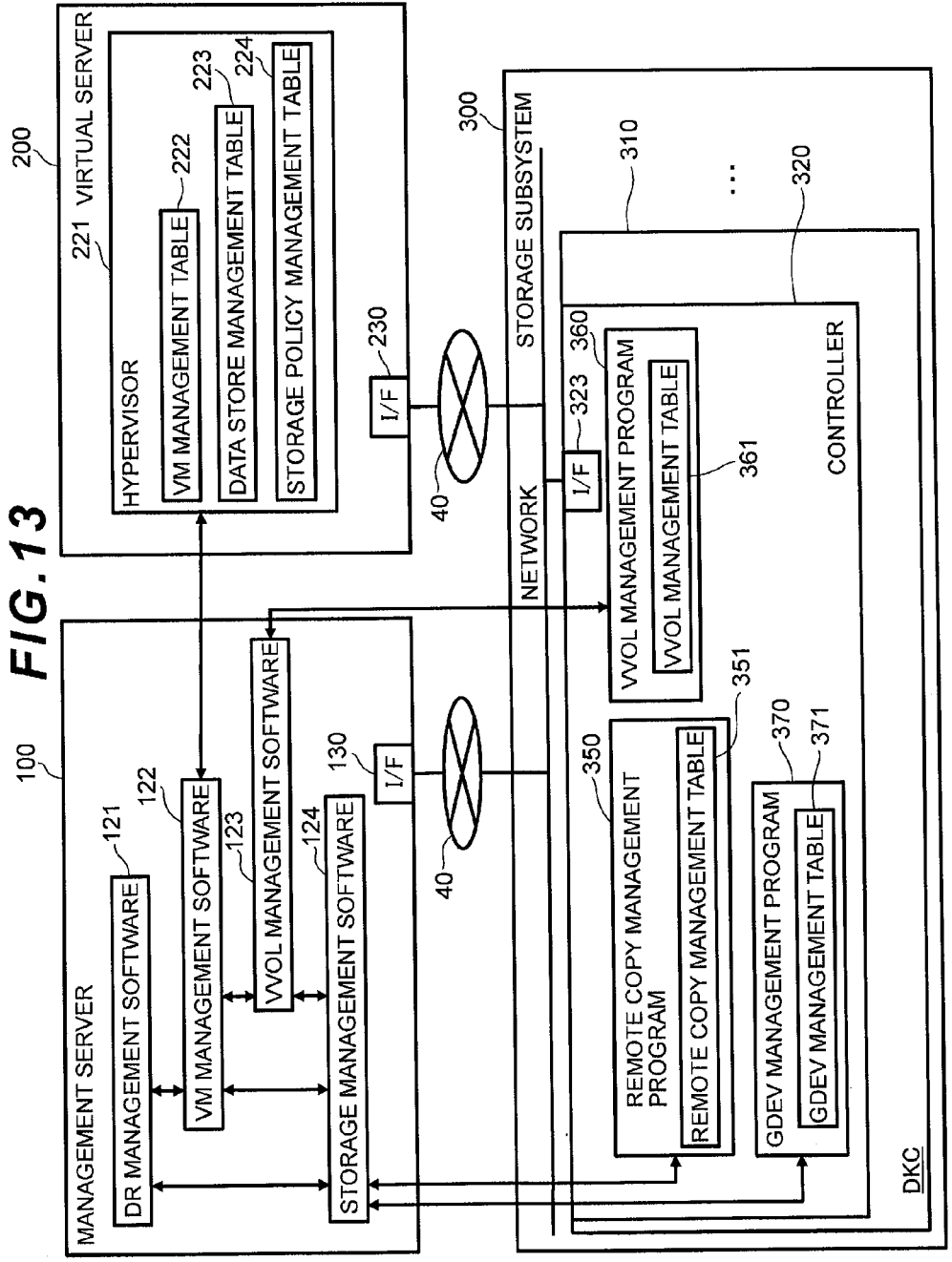
FIG. 13 is a conceptual diagram for explaining cooperation between virtual volumes and physical volumes when constructing a DR environment according to the embodiment.

Cooperation between each management software for the management server 100 when creating a volume at the remote copy destination, and the virtual server 200 or the storage subsystem 300 will be explained with reference to FIG. 13. The virtual machine management software 122 for the management server 100 automatically creates a volume at the remote copy destination and sets settings of remote copying based on the storage policy applied when constructing a virtual machine 250 at the local site.

Specifically speaking, the virtual machine management software 122 constructs a virtual machine 250 at the local side by executing the hypervisor 221 based on the storage policy created according to, for example, input by the system administrator. Then, the virtual machine management software 122 acquires volume information about a remote copy source from the VVOL management software 123 and the storage management software 124. Subsequently, the virtual machine management software 122 issues an instruction to the VVOL management software 123 to create a volume at the remote copy destination.

Having received the instruction to create the volume at the remote copy destination, the VVOL management software 123 acquires information about the GDEV(s) 500 in the storage subsystem 300 from the storage management software 124. The storage management software 124 acquires information about the GDEV(s) 500 in the storage subsystem 300 from the remote copy management program 350 or the GDEV management program 370 for the disk control devices 310 periodically or at a specified opportunity.

Then, the VVOL management software 123 sets a VVOL network 40 for the volume at the remote copy destination so that it will have the same GDEV configuration as that of the volume at the remote copy source. The VVOL management software 123 notifies the VVOL management program 360 for the disk control devices 310 of the setting content of the VVOL network 40.

Once the configuration of the GDEVs 500 to be mapped to the VVOL network 40 for the volume as described above is decided, the virtual machine management software 122 issues an instruction to the DR management software 121 to set a DR configuration. Having received the instruction to set the DR configuration, the DR management software 121 issues an instruction to the storage management software to form a pair of a remote copy source volume and a remote copy destination volume. Then, the storage management software 124 executes setting of a remote copy between the remote copy source volume and the remote copy destination volume.

For example, the storage management software 124 makes the number of the GDEVs 500 constituting the VVOL network 40 match the number of the disk control devices 310 at the local site or the remote site. As a result, it is possible to execute parallel processing as many times as the number of the disk control devices 310 when performing the remote copy, and enhance the effects of increasing the speed of copy processing when copying a large amount of data, for example, at the time of initial copying of the remote copy or at the time of recovery copying for recovery from a failure.

(2-4) DR Environment Creation Processing Using Storage Policy

Figure 14:
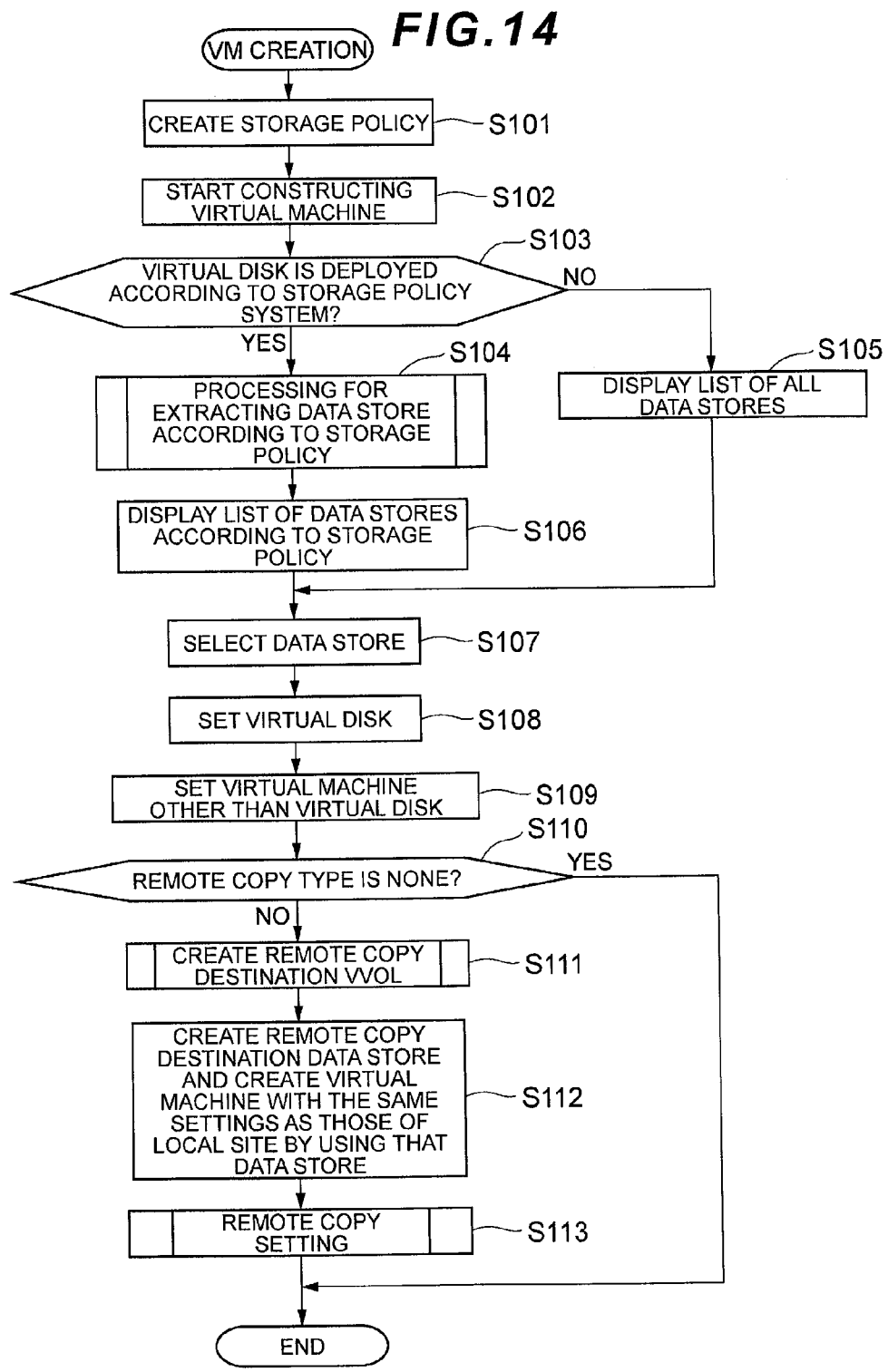
FIG. 14 is a flowchart illustrating DR environment creation processing using a storage policy according to the embodiment.

Next, the details of DR environment creation processing using the storage policy will be explained with reference to FIG. 14 to FIG. 17. FIG. 14 is a flowchart illustrating the virtual machine creation processing using the storage policy. Since step S101 to step S109 in FIG. 14 are the same as those in FIG. 10 of the first embodiment, any detailed explanation about them has been omitted.

Incidentally, since processing added to the processing of the first embodiment is executed for the data store extraction processing in step S104 during the processing from step S101 to step S109, that processing will be explained in detail with reference to FIG. 15. Since processing from step S121 to step S125 in FIG. 15 is the same as that in FIG. 11 of the first embodiment, any detailed explanation about it has been omitted.

Figure 15:
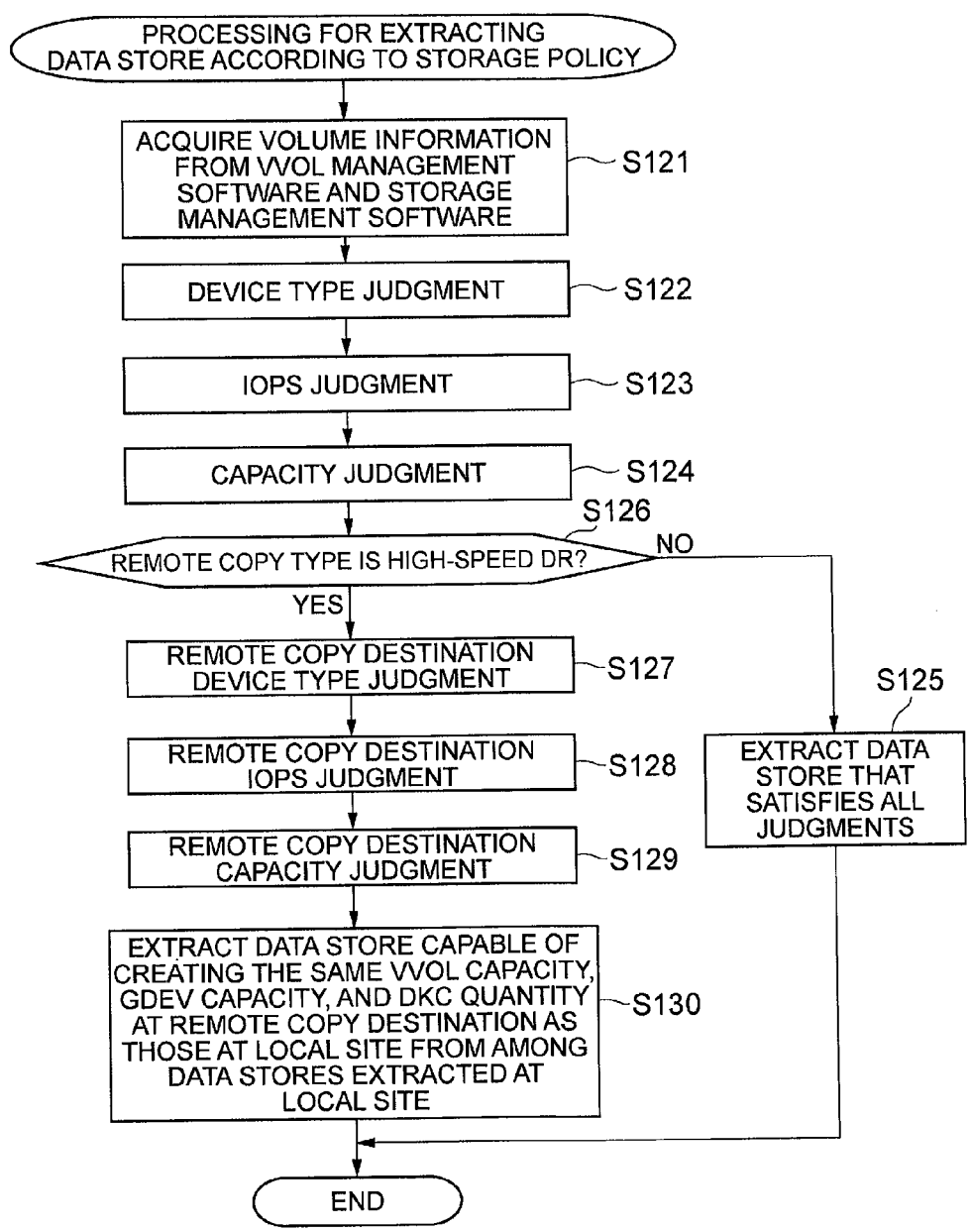
FIG. 15 is a flowchart illustrating a flow of data store extraction processing according to the embodiment.

After comparing the volume information which is set to the storage policy from step S122 to step S124 with the volume information acquired in step S121, the virtual machine management software 122 judges whether the remote copy type is high-speed DR or not (S126) as illustrated in FIG. 15. The virtual machine management software 122 judges whether the remote copy type is the high-speed DR or not, by referring to the remote copy type of the storage policy management table 224 shown in FIG. 9.

Now, the remote copy type will be explained. Information indicating whether the remote copy should be performed at a high speed, medium speed, or low speed (high-speed DR, medium-speed DR, or low-speed DR) is set to the remote copy type. Moreover, if it is unnecessary to perform the remote copy, that is, if it is unnecessary to construct the DR environment, information indicating that the construction of the DR environment is unnecessary (NONE) is set. The high-speed DR (disaster recovery) means that it is necessary to perform the remote copy at a high speed. For example, data which need to be urgently recovered from a failure, such as online data of financial systems can be listed as data which require the remote copy at a high speed. If the high-speed DR is set as the remote copy type, the remote copy can be performed at a high speed by setting the configuration of the logical volumes (GDEV) 500 mapped to the virtual volume (VVOL) network 40 at the remote site as the same configuration as that of the local site.

Moreover, the medium-speed DR is set, for example, in a case where there is an urgent need, but the number of the disks 330 at the remote site is set to be smaller than the number of the disks 330 at the local side because of, for example, cost reduction. If the medium-speed DR is set as the remote copy type, the device type of the logical volumes (GDEV) 500 mapped to the virtual volume (VVOL) network 40 at the remote site may be the same as that of the local site, but the number of GDEVs mapped to the VVOL network 40 may be set to be smaller than that at the remote site.

Furthermore, the low-speed DR is set in a case where there is no urgent need for failure recovery of, for example, archival data and inexpensive devices (SATA) are used at the remote site for cost reduction. If the low-speed DR is set as the remote copy type, inexpensive disks 330 such as SATA are mapped to the virtual volume (VVOL) network 40 at the remote site.

If it is determined in step S126 that the remote copy type is the high-speed DR, the virtual machine management software 122 judges whether or not any data store 260, which matches the device type set to the storage policy, exists at the remote copy destination (S127).

Then, the virtual machine management software 122 judges whether or not any data store 260, which matches the IOPS set to the storage policy, exists at the remote copy destination (S128).

Subsequently, the virtual machine management software 122 judges whether or not any data store 260, which matches the capacity set to the storage policy, exists at the remote copy destination (S129).

Then, the virtual machine management software 122 extracts a data store 260 capable of creating the same capacity of the VVOL network 40, the same capacity of the GDEVs 500, and the same number of the disk control devices 310 at the remote copy destination as those of the local site from among the data stores 260 extracted at the local site (S130).

If it is determined in step S126 that the remote copy type is not the high-speed DR, the virtual machine management software 122 extracts a data store 260 which satisfies all the judgments in step S122 to step S124 (S125).

Referring back to FIG. 14, after setting the settings of the virtual machine 250 during the processing from step S101 to step S109, the virtual machine management software 122 judges whether the remote copy type set to the storage policy is NONE or not (S110). The remote copy type NONE means that it is unnecessary to construct the DR environment as mentioned earlier.

If it is determined in step S110 that the remote copy type is NONE, the virtual machine management software 122 terminates the processing.

On the other hand, if it is determined in step S110 that the remote copy type is not NONE, that is, the settings are designed to construct the DR environment, the virtual machine management software 122 creates a VVOL network 40 at the remote copy destination (S111).

Figure 16:
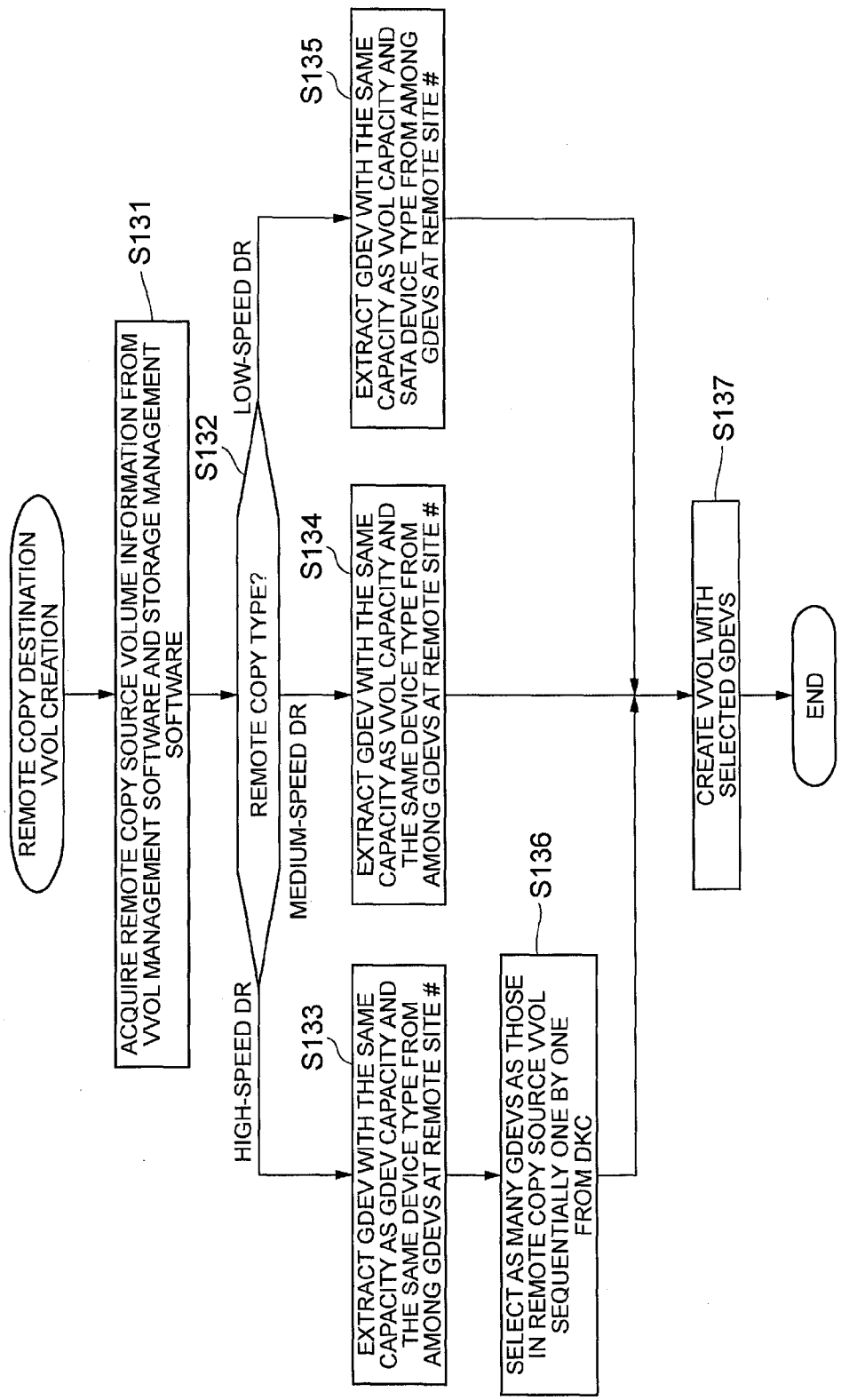
FIG. 16 is a flowchart illustrating a flow of VVOL creation processing at a remote copy destination according to the embodiment.

The processing for creating the VVOL network 40 at the remote copy destination will be explained in detail with reference to FIG. 16. The virtual machine management software 122 acquires the volume information about the virtual volume network 40 of the remote copy source from the VVOL management software 12 and the storage management software 124 as illustrated in FIG. 16 (S131).

The virtual machine management software 122 judges whether the remote copy type included in the volume information acquired in step S131 is the high-speed DR, the medium-speed DR, or the low-speed DR (S132).

If it is determined in step S132 that the remote copy type is the high-speed DR, the virtual machine management software 122 extracts GDEVs 500 of the same capacity and device type as those of the GDEVs 500 at the local site from among the GDEVs 500 at the remote site (S133).

Then, the virtual machine management software 122 selects as many GDEVs 500 of the same VVOL network 40 as the remote copy source one by one from different storage control devices (DKC) 310 from among the GDEVs extracted in step S133 (S136).

If it is determined in step S132 that the remote copy type is the medium-speed DR, the virtual machine management software 122 extracts GDEVs 500 of the same capacity and device type as those of the VVOL network 40 at the local site from among the GDEVs 500 at the remote site (S134). In the case where the remote copy type is the medium-speed DR, the medium-speed DR is set, for example, when the number of the disks 330 at the remote site is smaller than the number of the disks 330 at the local site because of cost reduction or the like as explained earlier. Therefore, if the capacity and device type are the same as those of the VVOL network 40 at the local site, the number of GDEVs 500 to be mapped to the VVOL network 40 or the number of the disk control devices 310 are not required unlike the case where the remote copy type is the high-speed DR.

If it is determined in step S132 that the remote copy type is the low-speed DR, the virtual machine management software 122 extracts GDEVs 500, whose capacity is the same as that of the VVOL network 40 at the local site and whose device type is SATA, from the GDEVs 500 at the remote site (S135).

Then, the virtual machine management software 122 has the VVOL management software 123 create a VVOL network 40 by using the GDEVs 500 selected in step S133, step S134, or step S135 (S137). Specifically speaking, the VVOL management software 123 stores information for associating the VVOL network 40 with the GDEVs 500 in the virtual volume management table 361.

Referring back to FIG. 14, after creating the VVOL network 40 at the remote copy destination in step S111, the virtual machine management software 122 issues an instruction to the virtual machine management software 122 at the remote site to create a virtual machine 250 of the same settings as that at the local site by using the data store 260 at the remote copy destination (S112).

Then, the virtual machine management software 122 sets settings of the remote copy (S113). Now, the remote copy setting processing in step S113 will be explained in detail with reference to FIG. 17.

Figure 17:
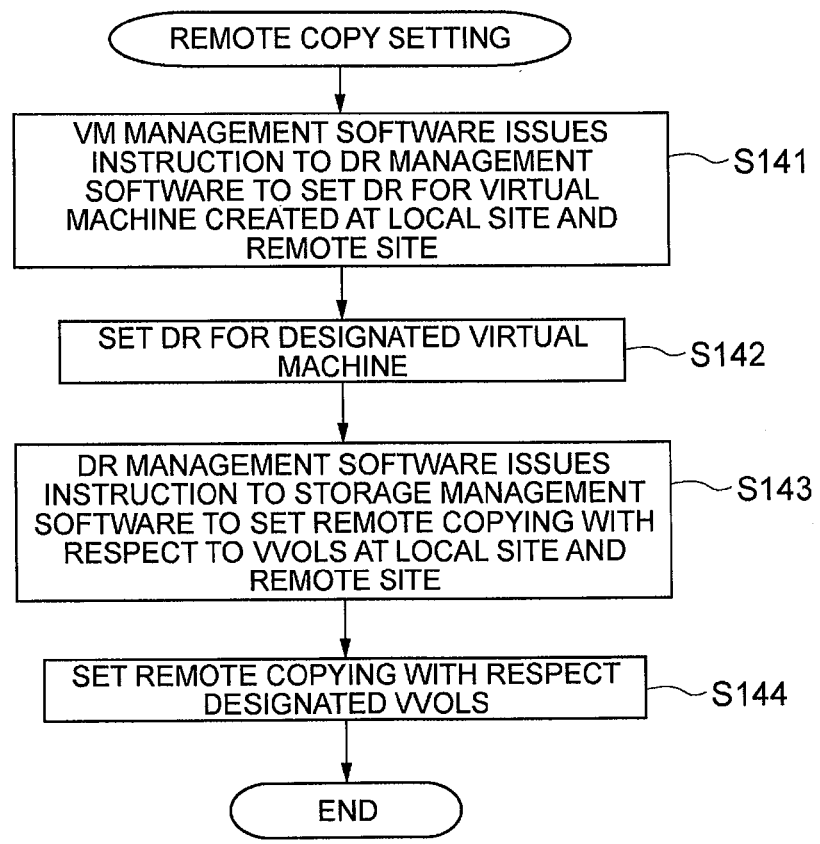
FIG. 17 is a flowchart illustrating a flow of remote copy setting processing according to the embodiment.

The virtual machine management software 122 issues an instruction to the DR management software 121 to set the DR settings to the virtual machines 250 created at the local site and the remote site as illustrated in FIG. 17 (S141).

Having received the DR setting instruction in step S141, the DR management software 121 sets the DR settings for, for example, associating the virtual machines 250 at the designated remote site and local site (S142).

Then, the DR management software 121 issues an instruction to the storage management software 124 to set remote copy settings to the virtual volume networks 40 at the local site and the remote site (S143).

Having received the remote copy setting instruction in step S143, the storage management software 124 sets the remote copy settings to the designated local site and remote site in order to, for example, associate the virtual volume networks 40 at both the designated local site and remote site (S144).

As a result of the above-described processing, creation of the DR environment using the storage policy, that is, setting of the remote copy is performed automatically. After the remote copy settings are set, detailed settings of the DR environment are set according to input by the administrator. Examples of the detailed settings of the DR environment can include creation of a recovery plan at the time of occurrence of a failure and creation of a protection group.

(2-5) Details of Remote Copy Processing

Next, the remote copy processing executed by the DR management software 121 will be explained in detail with reference to FIG. 18. Since the VVOL network 40 is recognized as a single volume by the host, the host cannot tell that the VVOL network 40 is actually composed of a plurality of GDEVs 500. So, the DR management software 121, the VVOL management software 123, and the storage management software 124 for the management server 100 cooperate with the storage subsystem 300 and the storage management software 124 issues an instruction to each disk control device 310 for the storage subsystem to perform remote copying to recognize that the VVOL network 40 is composed of the plurality of GDEVs 500, thereby making it possible to increase the speed of the remote copy.

Figure 18:
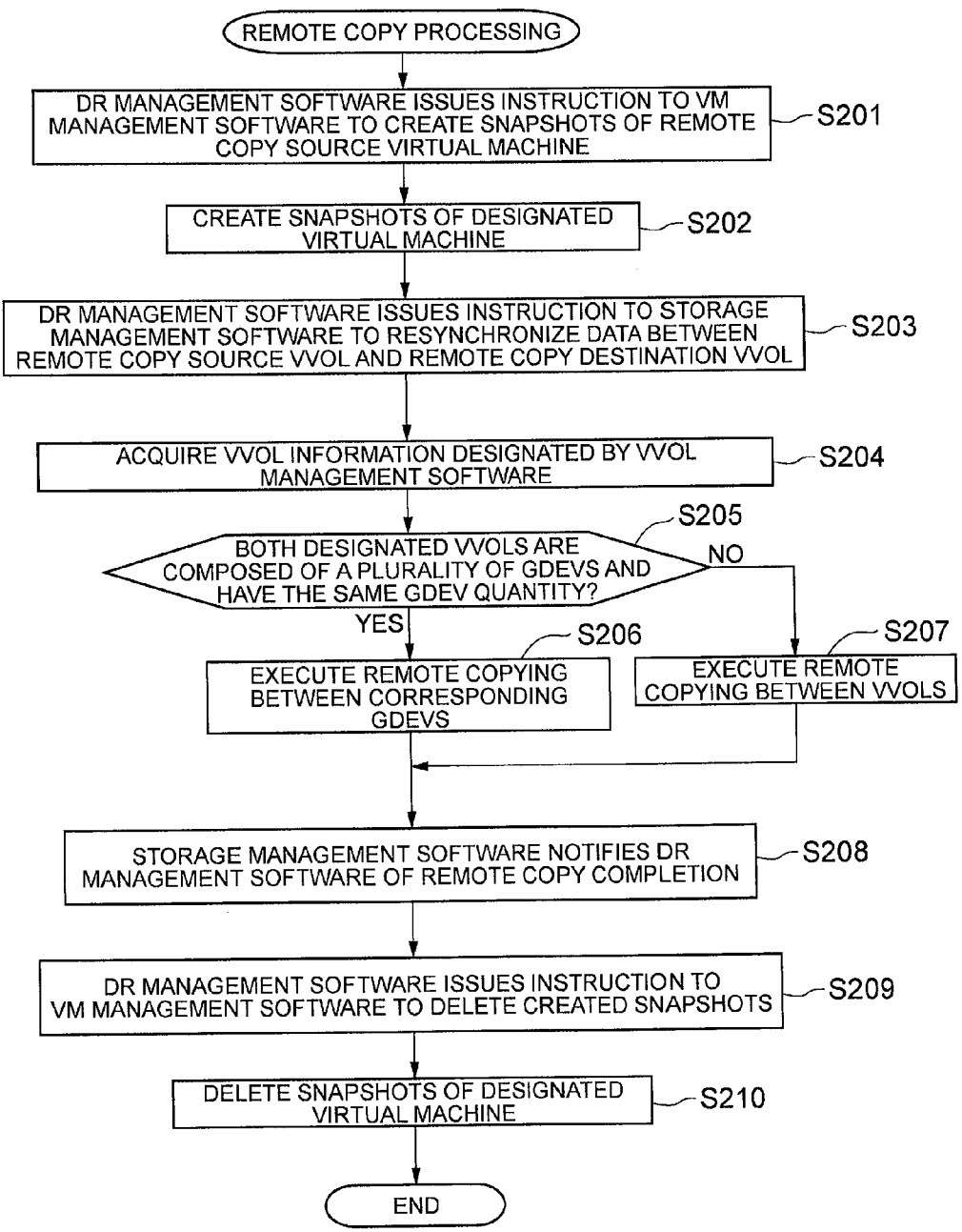
FIG. 18 is a flowchart illustrating a flow of remote copy processing according to the embodiment.

The DR management software 121 issues an instruction to the virtual machine management software 122 to create snapshots of a virtual machine 250 at the remote copy source as illustrated in FIG. 18 (S201).

Having received the snapshot creation instruction in step S201, the virtual machine management software 122 creates the snapshots of the designated virtual machine 250 (S202).

Then, the DR management software 121 issues an instruction to the storage management software 124 to resynchronize data of the VVOL network 40 at the remote copy source with the VVOL network 40 at the remote copy destination (S203).

The storage management software 124 acquires the volume information about the VVOL network 40 at the remote copy source and the VVOL network 40 at the remote copy destination, which were designated in step S203 (S204).

Then, the storage management software 124 judges whether or not each of the VVOL network 40 at the designated remote copy source and the VVOL network 40 at the remote copy destination is composed of a plurality of GDEVs 500 and has the same number of GDEVs 500, based on the volume information acquired in step S204 (S205).

If it is determined in step S205 that each of the designated VVOL networks 40 is composed of a plurality of GDEVs 500 and has the same number of GDEVs 500, the remote copy is executed between the corresponding GDEVs at the remote copy source and the remote copy destination (S206). On the other hand, if it is determined in step S205 that either one of the designated VVOL networks 40 is not composed of a plurality of GDEVs 500 and they don't have the same number of GDEVs 500, the remote copy is executed between the corresponding VVOL networks 40 at the remote copy source and the remote copy destination (S207).

When the remote copy is executed between the corresponding GDEVs 500 in step S206 described above, the plurality of disk control devices 310 which manage the GDEVs 500 can execute the copy processing in parallel, thereby making it possible to increase the speed of the remote copy. On the other hand, the remote copy is executed between the VVOL networks 40 in step S207, so that single copy processing is executed.

Then, when the remote copy is completed, the storage management software 124 notifies the DR management software 121 of completion of the remote copy (S208).

Subsequently, the DR management software 121 issues an instruction to the virtual machine management software 122 to delete the snapshots created in step S202 (S209). Having received the snapshot deletion instruction in step S209, the virtual machine management software 122 deletes the snapshots of the designated virtual machine 250 (S210).

Incidentally, when constructing the virtual machine by using the aforementioned storage policy, the virtual machine management software 122 for the management server 100 sets conceptual settings such as the high-speed DR, the medium-speed DR, or the low-speed DR as the storage policy. Specifically speaking, what kind of VVOL network 40 should be constructed is set by the VVOL management program 360 in the storage subsystem 300.

For example, there is a case in which the configuration of logical volumes (GDEVs) 500 to be mapped to the virtual volume (VVOL) network 40 at the remote site is set as the same configuration as that at the local site in order to increase the speed of the remote copy as described above. Moreover, when the number of the disks 330 at the remote site is smaller than the number of the disks 330 at the local site because of cost reduction, there are some possible cases in which the device type of the logical volumes (GDEVs) 500 to be mapped to the virtual volume (VVOL) network 40 at the remote site may be set to be the same device type as that at the local site, but the number of GDEVs to be mapped to the VVOL network 40 may be set to be smaller than that at the remote site, or in which inexpensive disks 330 such as SATA may be mapped to the virtual volume (VVOL) network 40 at the remote site.

(2-6) Advantageous Effects of this Embodiment

According to this embodiment, when the remote copy column of the storage policy management table 224 includes information indicating that remote copying is to be executed between the local site and the remote site (the high-speed DR, the medium-speed DR, or the low-speed DR), the plurality of disk control devices 310 map a specified number of logical volumes (GDEVs 500), from among a plurality of logical volumes (GDEVs 500), to a virtual volume (VVOL network 40) at the local site and a virtual volume (VVOL network 40) at the remote site according to the remote copy type included in the storage policy in response to a request from the management server 100. As a result, it is possible to facilitate the construction of the DR (disaster recovery) environment and increase the speed of remote copying.

(3) Third Embodiment (3-1) Outline of this Embodiment

In this embodiment in the same manner as in the first embodiment, the storage policies are set in advance, the relationship between the virtual volume (VVol) networks 40 and the logical volumes (GDEV) 500 is established for each of the storage policies in advance; and when constructing a virtual machine 250, the preset storage policy is selected to construct the virtual machine 250. It is possible to set an upper limit and lower limit of IOPS as the storage policy as illustrated in FIG. 9.

Also in this embodiment like the first embodiment, virtual volume (VVOl) networks 40 are allocated to virtual machines 250 based on the storage policy and a VVOL network 40 is composed of a plurality of GDEVs 500.

Figure 19:
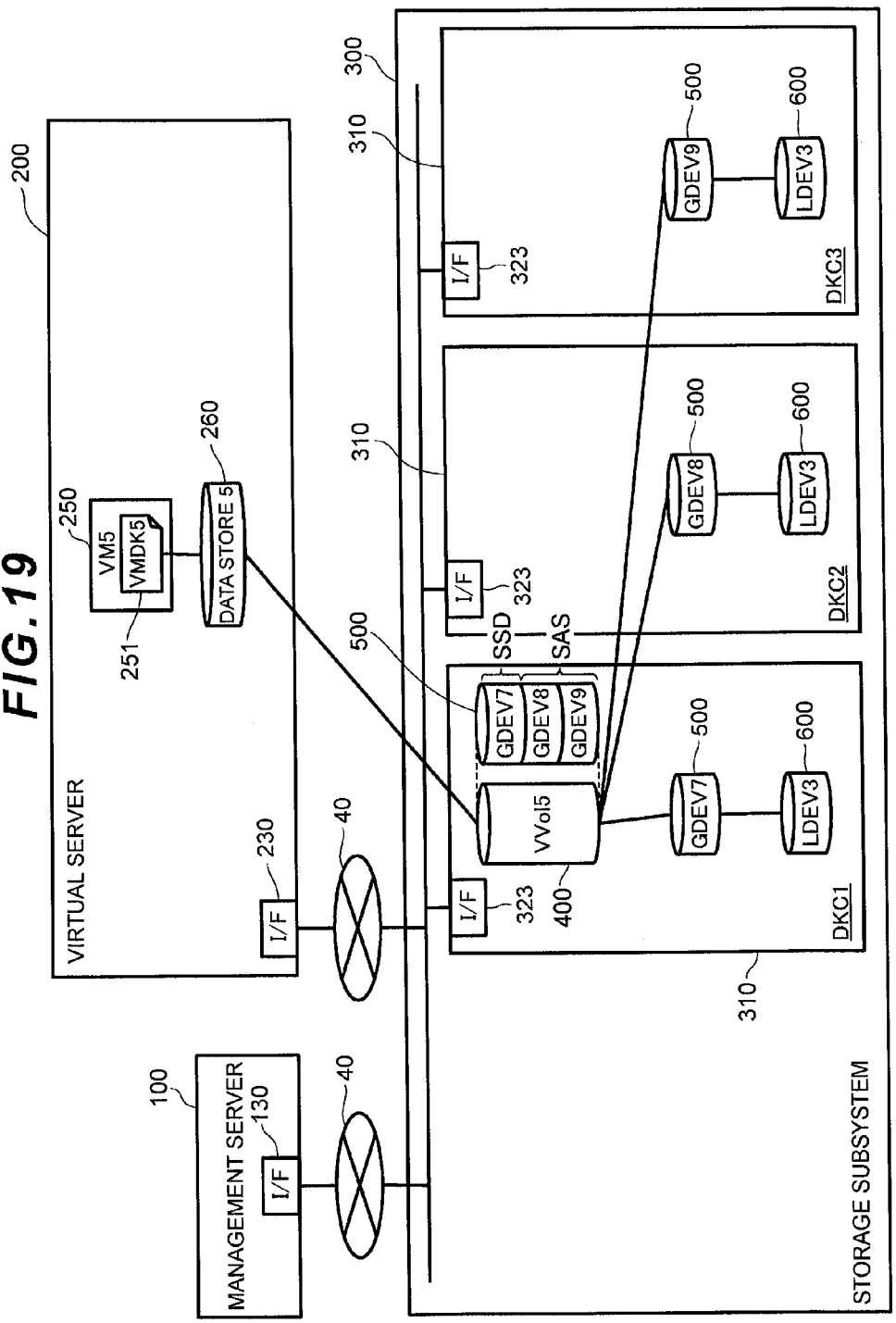
FIG. 19 is a conceptual diagram for explaining mapping of logical volumes to virtual volumes according to a third embodiment of the present invention.

For example, let us assume that CUSTOM_A is designated as the storage policy illustrated in FIG. 9 to satisfy, for example, the IOPS set to the storage policy. For example, CUSTOM_A is assumed to be a disk configuration set by the system administrator in order to increase the speed by using SSDs to compose only a leading area of the virtual volume (VVOL) network 40 for an OS which uses the leading area as a management area. For example, referring to FIG. 19, VVOL 5 which is a virtual volume of the disk control device 310 is made to correspond to a data store 260 which is a virtual volume of the virtual server 200 and VVOL 5 is constituted from GDEV 7, GDEV 8, and GDEV 9.

Now, when the leading area of the virtual volume is used as the management area, for example, when the management area is at a leading part of, for example, a file system and the speed of the leading area needs to be increased, a possible solution is to map GDEV 7, which is SSD, to the leading area of VVOL 5 and map GDEV 8 and GDEV 9, which are SAS, to an area other than the leading area. Moreover, when mapping a combination of different device types to the VVOL network 40 as described above, for example, CUSTOM_A indicating that the device type is designated by the administrator or the like is set to the device type column 2241 of the storage policy.

Figure 20:
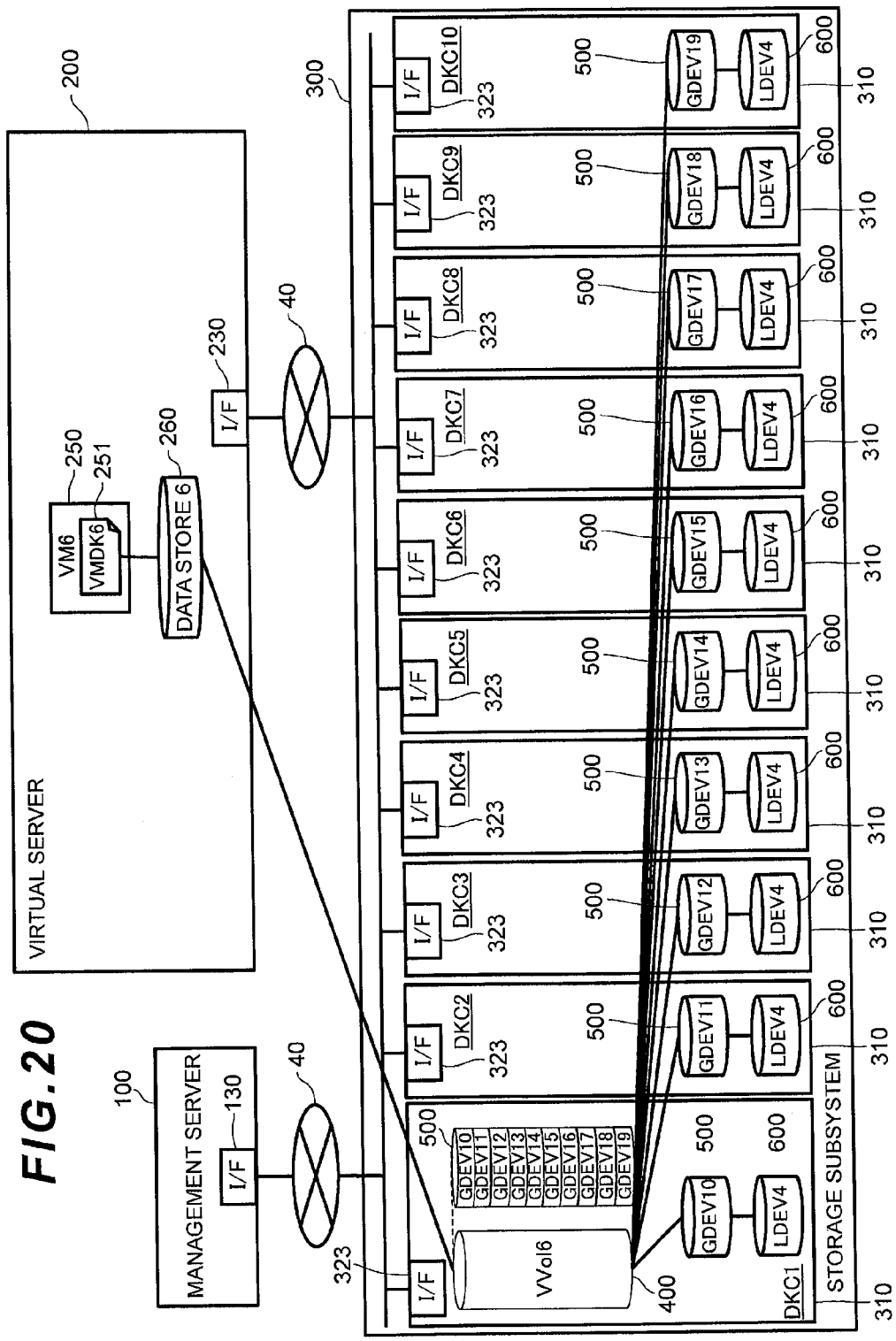
FIG. 20 is a conceptual diagram for explaining mapping of logical volumes to virtual volumes according to the embodiment.

Furthermore, when the storage subsystem 300 is equipped with a large number of inexpensive controllers, a high-performance virtual volume can be constructed by using GDEV(s) 500 with a small capacity in the disk control devices 310 for the storage subsystem 300 to construct the VVOL network 40 and distributing loads among the disk control devices 310. For example, referring to FIG. 20, VVOL 6 which is a virtual volume of the disk control device 310 is made to correspond to a data store 260 which is a virtual volume of the virtual server 200 and VVOL 6 is composed of GDEV 10 to GDEV 19 provided by ten disk control devices 310.

When the storage subsystem is equipped with a large number of inexpensive controllers as described above, the GDEVs 500 of the plurality of disk control devices 310 are mapped to one VVOL network 40, thereby making it possible to distribute the loads of data processing among the plurality of disk control devices 310 and provide a high-performance virtual volume.

Even if the VVOL network 40 is set to satisfy, for example, the IOPS which is set to the storage policy as described above, once data writing or the like is performed in response to a request from the virtual machine 250, a high load is imposed on some of the GDEVs 500 mapped to the VVOL network 40, that is, on some of the LDEVs 600 and the IOPS setting of the storage policy may no longer be satisfied.

So, in this embodiment, the virtual machine management software 122 for the management server 100 cooperate with the storage subsystem 300 to monitor performance; and if performance conditions such as the IOPS no longer comply with the storage policy, the virtual machine management software 122 notifies the VVOL management software 123 to that effect. Then, the VVOL management software 123 changes mapping of the GDEVs 500 mapped to the VVOL network 40 to satisfy the performance conditions such as the IOPS of the storage policy.

Since only the VVOL network 40 is recognized by the virtual machine 250 as described earlier, it is unnecessary to change mapping between the data store(s) 260 of the virtual machine(s) 250 and the VVOL network 40 when performing load distribution in the storage system; and it is only necessary to change mapping between the VVOL network 40 and the GDEVs in the storage system. As a result, it is possible to perform the load distribution of the storage system without stopping the virtual machine 250.

(3-2) Configuration of Computer System

Since a computer system according to this embodiment is the same as that according to the first embodiment, any detailed explanation about it has been omitted. Furthermore, since the hardware configuration and the software configuration of the management server 100, the virtual server 200, and the storage subsystem 300 which constitute the computer system are the same as those according to the first embodiment, any detailed explanation about it has been omitted. In the following explanation, the change of mapping of the GDEVs 500 mapped to the VVOL network 40 to be performed under the performance conditions according to this embodiment will be particularly described in detail.

Figure 21:
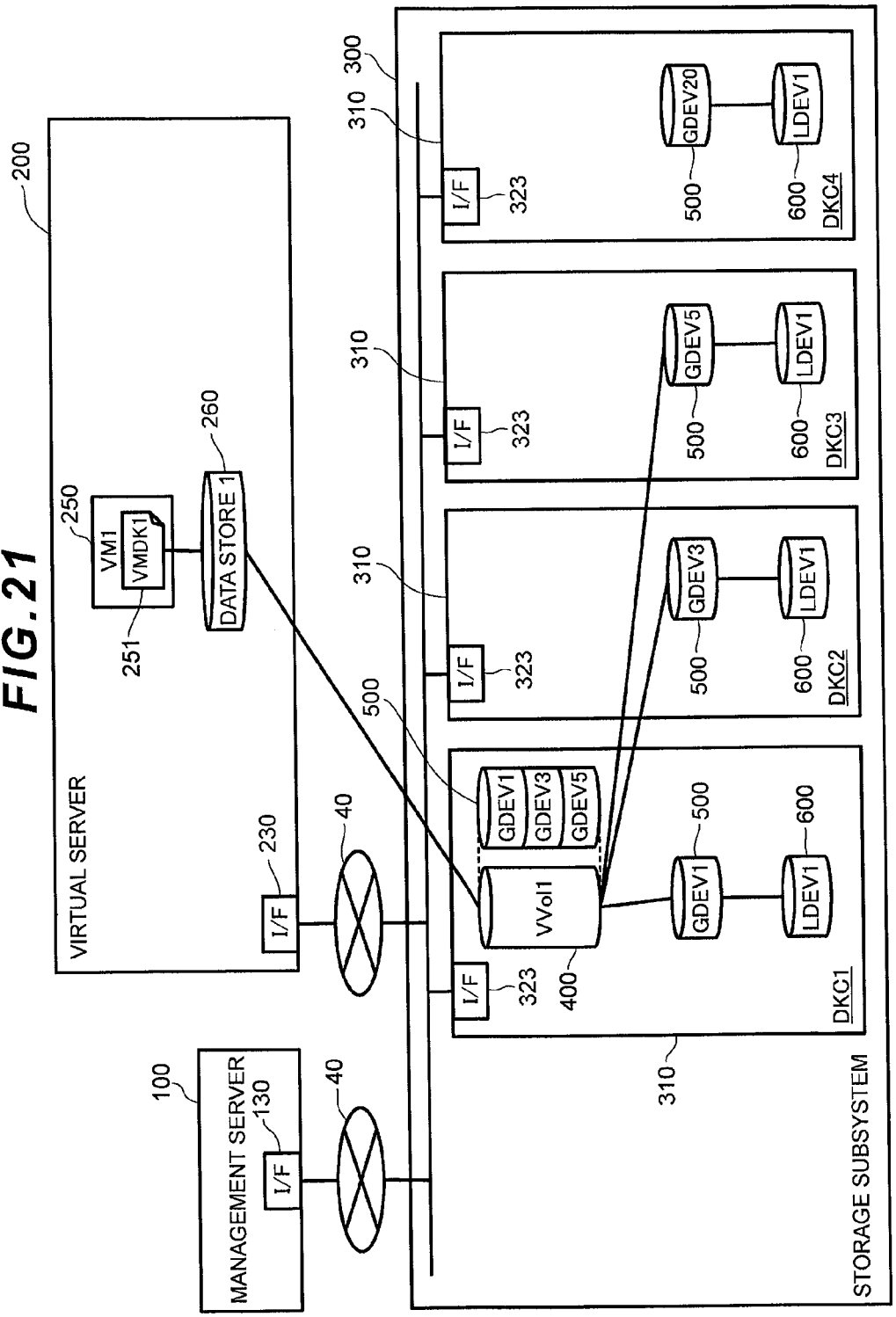
FIG. 21 is a conceptual diagram for explaining mapping of logical volumes to virtual volumes according to the embodiment.

As illustrated in FIG. 21, for example, VVOL 1 which is a virtual volume of the disk control devices 310 is made to correspond to a data store 260 which is a virtual volume of the virtual server 200 and VVOL 1 is constituted from GDEV 1 of DKC 1, GDEV 3 of DKC 2, and GDEV 5 of DKC 3 in the disk control devices 310.

Figure 22:
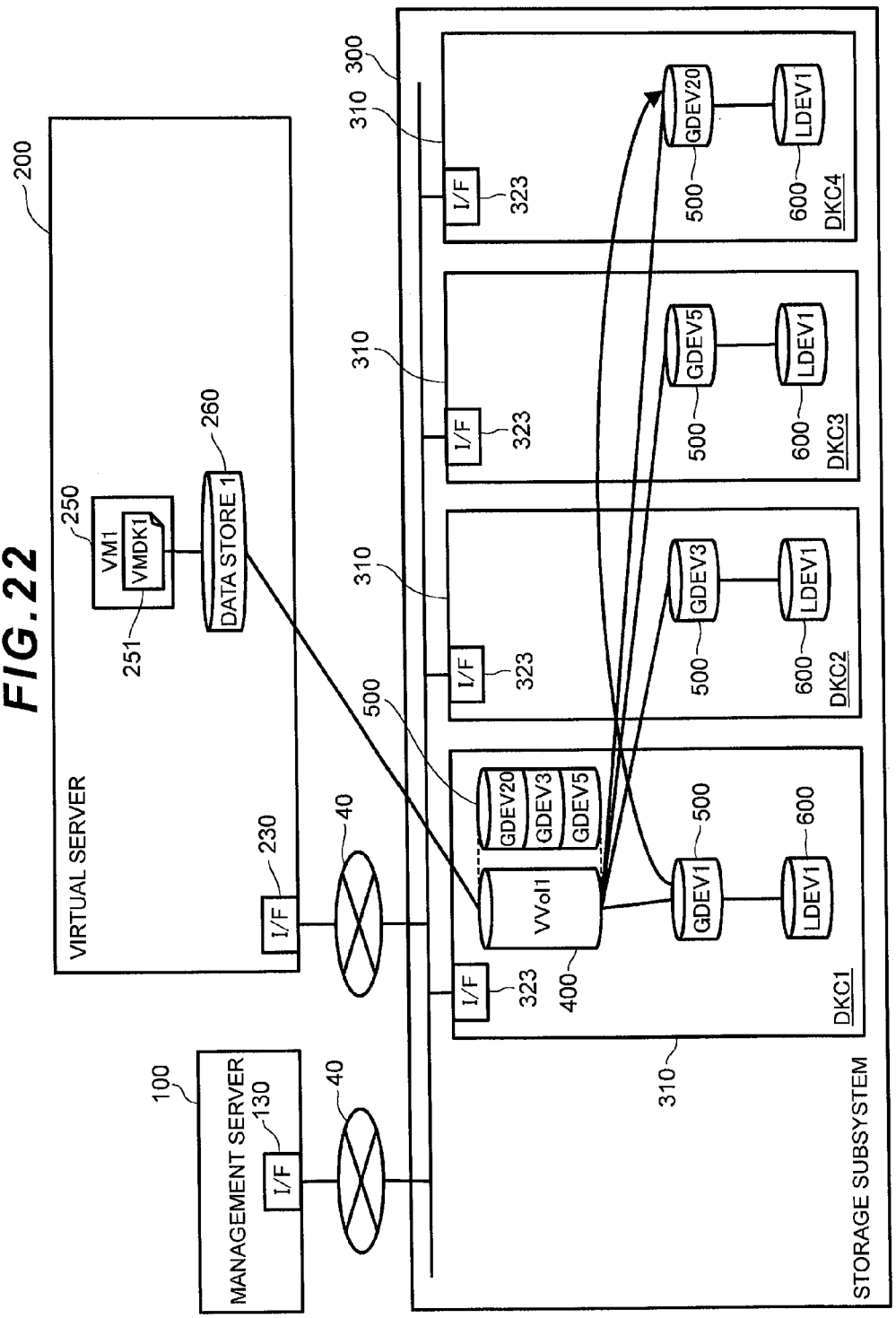
FIG. 22 is a conceptual diagram for explaining mapping of logical volumes to virtual volumes according to the embodiment.

Let us assume that the IOPS of VVOL 1 falls below a lower limit value set to the storage policy as a result of, for example, data writing in response to a request from the virtual machine 250. Let us also assume that a logical volume LDEV 1 associated with GDEV 1 has the highest load among three logical volumes associated with VVOL 1. In this case, as illustrated in FIG. 22, GDEV 20 of DKC 4 in a disk control device 310 with a low load is mapped to VVOL 1 instead of GDEV 1 mapped to VVOL 1, thereby implementing reconstruction. As a result, it is possible to distribute the loads and set the IPOS as a required value.

Moreover, if the IOPS of VVOL 1 falls below the lower limit value set to the storage policy, a possible method would be to distribute the loads by increasing the number of GDEVs constituting VVOL 1. In this case, GDEVs managed by a disk control device 310 other than the disk control devices (DKC) 310, which manage the GDEVs already constituting VVOL 1 are mapped to VVOL 1, thereby reconstructing VVOL 1. As a result, the loads can be distributed among the plurality of disk control devices 310, thereby setting the IOPS as the requested value.

Furthermore, let us assume that the IOPS of VVOL 1 exceeds the upper limit value set to the storage policy. In this case, VVOL 1 may be reconstructed by reducing the number of GDEVs mapped to VVOL 1 or by reducing the number of the disk control devices 310 for providing the GDEVs without changing the number of GDEVs.

Accordingly, only the virtual volume VVOL can be recognized from outside the storage subsystem 300 by mapping the virtual volume VVOL to the plurality of GDEVs で mapping, so that data can be migrated on the storage subsystem 300 side without changing mapping to the data store 260.

(3-3) VVOL Reconstruction Processing for Load Distribution

Figure 23:
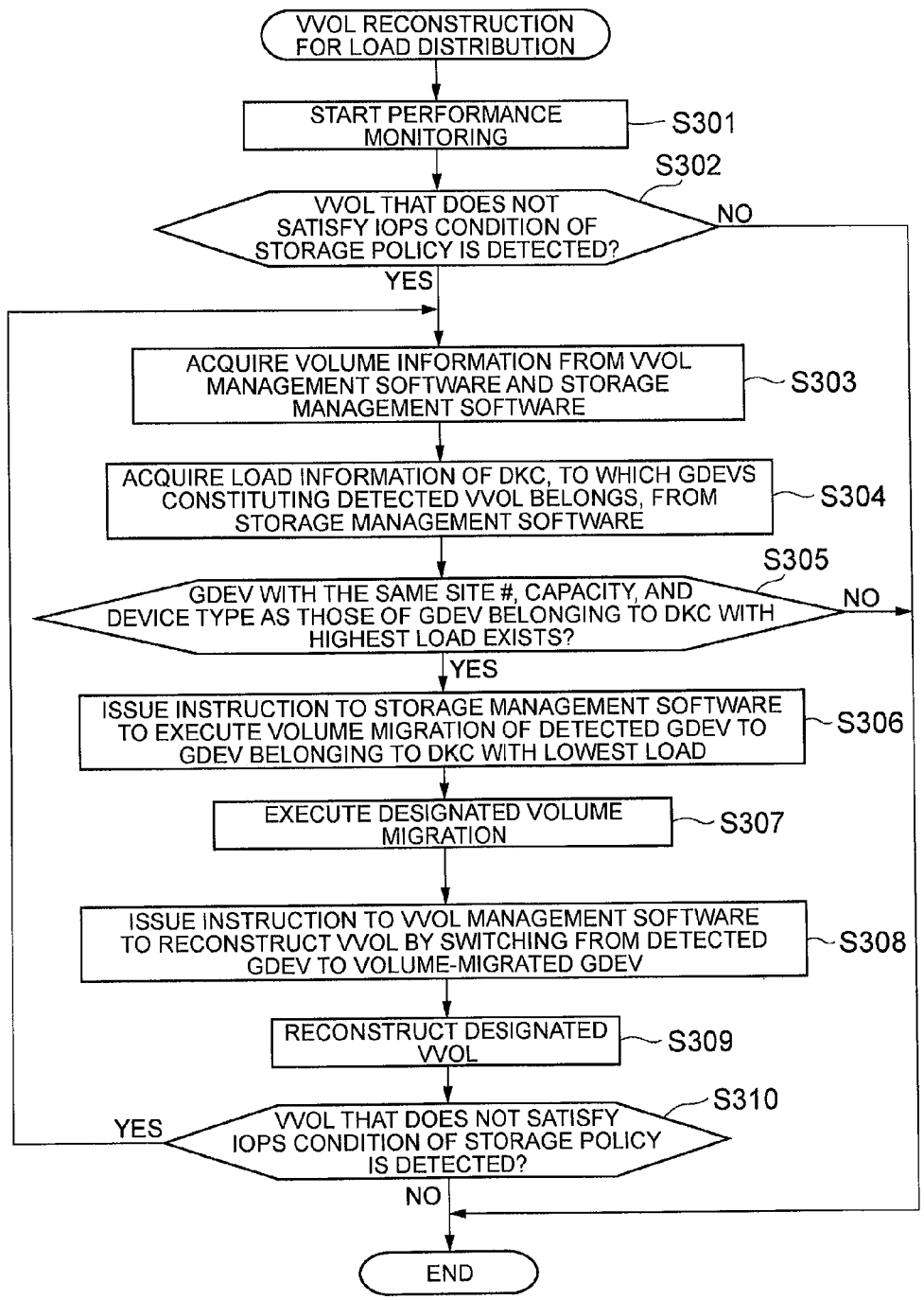
FIG. 23 is a flowchart illustrating a flow of VVOL reconstruction processing for load distribution according to the embodiment.

Next, VVOL reconstruction processing for load distribution will be explained in detail with reference to FIG. 23. The virtual machine management software 122 starts monitoring the performance of VVOL networks 40 (S301) as illustrated in FIG. 23. The performance monitoring in step S301 is executed periodically.

As the result of the performance monitoring in step S301, the virtual machine management software 122 judges whether or not a VVOL network 40 which does not satisfy the IOPS conditions of the storage policy has been detected (S302). If any VVOL network 40 which does not satisfy the IOPS conditions of the storage policy has not been detected in step S302, the virtual machine management software 122 terminates the processing.

On the other hand, if it is determined in step S302 that a VVOL network 40 which does not satisfy the IOPS conditions of the storage policy has been detected, the virtual machine management software 122 acquires the volume information about the relevant VVOL network 40 from the VVOL management software 123 and the storage management software 124 (S303).

Then, the virtual machine management software 122 acquires load information about a disk control device(s) (DKC) 310, to which GDEV(s) 500 constituting the detected VVOL network 40 belong, from the storage management software 124 (S304).

Subsequently, the virtual machine management software 122 judges whether or not there are any GDEV(s) with the same site number, capacity, and device type as those of GDEV(s) 500 belonging to a disk control device 310 with the highest load (S305). Specifically speaking, the virtual machine management software 122 searches for the GDEV(s) with the same site number, capacity, and device type as those of the target GDEV(s) 500 by referring to the GDEV management table 371.

Then, the virtual machine management software 122 issues an instruction to the storage management software 124 to perform volume migration of the GDEV(s) 500 belonging to the disk control device 310 with the highest load in step S305 to GDEVs belonging to a disk control device 310 with the lowest load found by the search in step S305 (S306).

Having received the volume migration instruction in step S306, the storage management software 124 executes migration between the designated volumes (S307).

Then, the storage management software 124 issues an instruction to the VVOL management software 123 to switch the GDEV(s) 500 belonging to the disk control device 310 with the highest load with the GDEV(s) 500 by performing the volume migration and thereby reconstruct the VVOL network 40 (S308). Then, the VVOL management software 123 reconstructs the VVOL network 40 designated in step S308 (S309).

Incidentally, the processing for reconstructing the VVOL network 40 in step S309 may be executed without waiting for the termination of the migration processing between the volumes in step S307. Regarding the migration processing between the volumes, processing for writing/reading data to/from the volume before the migration or the volume after the migration by using a flag indicative of whether the migration has been completed or not with respect to each specified area (page) is executed in response to a data read/write request from the host.

Then, the virtual machine management software 122 judges whether another VVOL network 40 which does not satisfy the IOPS conditions of the storage policy has been detected or not (S310).

If it is determined in step S310 that the VVOL network 40 which does not satisfy the IOPS conditions of the storage policy has been detected, the virtual machine management software 122 repeats the processing in step S303 and subsequent steps. On the other hand, if the VVOL network 40 which does not satisfy the IOPS conditions of the storage policy has not been detected in step S310, the virtual machine management software 122 terminates the VVOL reconstruction processing.

(3-4) Advantageous Effects of this Embodiment

According to this embodiment, when the information indicative of the upper limit and/or lower limit of the I/O performance is set to the storage policy management table 224 and the I/O performance of the virtual volume (the VVOL network 40) no longer satisfies the upper limit and/or lower limit of the I/O performance set to the storage policy, a logical volume GDEV 500 which satisfies the upper limit and/or lower limit of the I/O performance is mapped, instead of the logical volume (the GDEV 500) associated with the virtual volume (the VVOL network 40), to the virtual volume (the VVOL network 40). As a result, when performing load distribution of the storage system, it is possible to execute migration without stopping the virtual machine 250.

REFERENCE SIGNS LIST 100 management server
121 DR management software
122 virtual machine management software
123 VVOL management software
124 storage management software
200 virtual server
221 hypervisor
222 virtual machine management table
223 data store management table
224 storage policy management table
300 storage subsystem
310 disk control device
350 remote copy management program
351 remote copy management table
360 VVOL management program
361 VVOL management table
370 GDEV management program
371 GDEV management table
380 LDEV management program
381 LDEV management table

The invention claimed is:

1. A storage system, comprising:
a plurality of disk control devices having a plurality of physical disks connected via a network to a management server managing the plurality of physical disks allocated to a virtual machine,
wherein the plurality of disk control devices:
manage a specified storage area provided by the plurality of physical disks as one or more logical volumes, and
map the one or more logical volumes complying with a storage policy or storage policies, which include capacity information about the virtual machine and are preset to construct the virtual machine, to a virtual volume or volumes provided to the virtual machine in response to a request from the management server,
wherein when one of the storage policies is selected, the management server constructs the virtual machine by associating the virtual volume or volumes, which comply with the storage policy, with the virtual machine,
wherein when the storage policy includes information indicating that a remote copy is to be performed between a local site, which is a copy source of the storage system, and a remote site which is a copy destination of the storage system, the plurality of disk control devices map a first specified number of logical volumes among the plurality of logical volumes, to a virtual volume at the local site and map a second specified number of logical volumes to a virtual volume at the remote site according to a remote copy type included in the storage policy, and wherein the second specified number of the logical volumes mapped to the virtual volume at the remote site is less than the first specified number of the logical volumes mapped to the virtual volume at the local site.

2. The storage system according to claim 1, wherein each of the plurality of disk control devices:

manages data input to and output from one or more physical volumes;

assigns identification information capable of identifying the plurality of disk control devices, to the plurality of logical volumes composed of the specified area of the plurality of physical volumes; and maps the plurality of logical volumes managed across the plurality of disk control devices to one of the virtual volumes.

3. The storage system according to claim 1, wherein when information indicative of I/O performance is set to the storage policy, the plurality of disk control devices map the logical volume, which satisfies the I/O performance set to the storage policy, to the virtual volume in response to a request from the management server.

4. The storage system according to claim 3, wherein when information indicative of a device type of the virtual volume is set to the storage policy, and the plurality of disk control devices map the logical volumes for the plurality of disk control devices having different performances for a leading area of the virtual volume and for other areas in response to a request from the management server.

5. The storage system according to claim 4, wherein one of the disk control devices maps the logical volumes associated with the physical volume with high performance to the leading area of the virtual volume and the other disk control devices map the logical volumes associated with the physical volume which does not have high performance to an area of the virtual volume other than the leading area.

6. The storage system according to claim 3, wherein the plurality of disk control devices map the plurality of logical volumes with a relative small capacity, which each of the plurality of disk control devices has, to the virtual volume in response to a request from the management server.

7. The storage system according to claim 1, wherein when the remote copy type included in the storage policy is set to high-speed, indicative of performance of the remote copy at a high speed, the plurality of disk control devices configure the logical volumes mapped to the virtual volume at the local site the same as a configuration of the logical volumes mapped to the virtual volume at the remote site.

8. The storage system according to claim 1, wherein when the remote copy type included in the storage policy is set to medium-speed, indicative of performance of the remote copy at a medium speed, the plurality of disk control devices map the logical volumes whose device type is the same as the logical volumes mapped to the virtual volume at the local site, to the virtual volume at the remote site in response to a request from the management server.

9. The storage system according to claim 1, wherein when the remote copy type included in the storage policy is set to low-speed, indicative of performance of the remote copy at a low speed, the plurality of disk control devices map the logical volume or volumes with low performance to the virtual volume at the remote site.

10. The storage system according to claim 1, wherein when information indicative of an upper limit and/or lower limit of I/O performance is set to the storage policy, the plurality of disk control devices map the logical volume or volumes, which satisfy the upper limit and/or lower limit of the I/O performance, to the virtual volume in response to a request from the management server, and wherein when I/O performance of the virtual volume no longer satisfies the upper limit and/or lower limit of the I/O performance, which is set to the storage policy, the logical volume which satisfies the upper limit and/or lower limit of the I/O performance is mapped, instead of the logical volume associated with the virtual volume, to the virtual volume.

* * * * *